(12) United States Patent
Hartman

(10) Patent No.: US 11,142,167 B2
(45) Date of Patent: Oct. 12, 2021

(54) WIPER BLADE WITH DIRECTIONALLY DIFFERENTIATED MOTION

(71) Applicant: Steam Tech, LLC, Denver, CO (US)

(72) Inventor: Philip Hartman, Windsor, CO (US)

(73) Assignee: Steam Tech, LLC, Denver, CO (US)

( * ) Notice: Subject to any disclaimer, the term of this patent is extended or adjusted under 35 U.S.C. 154(b) by 43 days.

(21) Appl. No.: 16/721,234

(22) Filed: Dec. 19, 2019

(65) Prior Publication Data

US 2020/0216035 A1 Jul. 9, 2020

Related U.S. Application Data

(60) Provisional application No. 62/893,030, filed on Aug. 28, 2019, provisional application No. 62/789,400, filed on Jan. 7, 2019.

(51) Int. Cl.
*B60S 1/34* (2006.01)
*B60S 1/38* (2006.01)

(52) U.S. Cl.
CPC .......... *B60S 1/3415* (2013.01); *B60S 1/3853* (2013.01); *B60S 1/3862* (2013.01); *B60S 1/3886* (2013.01); *B60S 2001/3836* (2013.01)

(58) Field of Classification Search
CPC .......... B60S 1/3404; B60S 1/28; B60S 1/524; B60S 1/3402; B60S 2001/3827; B60S 1/3853; B60S 1/3862; B60S 1/3886; B60S 1/3415; B60S 2001/3836
See application file for complete search history.

(56) References Cited

U.S. PATENT DOCUMENTS

| | | | |
|---|---|---|---|
| 2,576,198 | A | 11/1951 | Stuart |
| 3,793,670 | A | 2/1974 | Riester et al. |
| 3,881,212 | A | 5/1975 | Regler |
| 5,065,471 | A | 11/1991 | Laplante |
| 5,235,720 | A | 8/1993 | Kinder |
| 5,539,951 | A | 7/1996 | Guell et al. |
| 5,699,581 | A | 12/1997 | Heneghan et al. |
| 5,778,483 | A | 7/1998 | Dawson |
| 5,819,360 | A | 10/1998 | Fujii |
| 5,957,384 | A | 9/1999 | Lansinger |
| 5,979,010 | A | 11/1999 | Dockery et al. |
| 6,076,216 | A | 6/2000 | Biryukov |

(Continued)

FOREIGN PATENT DOCUMENTS

| CN | 203124355 | 8/2013 |
|---|---|---|
| CN | 103693019 A | 4/2014 |

(Continued)

OTHER PUBLICATIONS

CN103693019A (machine translation) (Year: 2014).*

(Continued)

*Primary Examiner* — Andrew A Horton
(74) *Attorney, Agent, or Firm* — Craig R. Miles; CR Miles P.C.

(57) ABSTRACT

A wiper including wiper bracket which couples a wiper arm to blade carrier which carries one or more blades and includes an internal flow path which conducts fluid from a wiper bracket inlet through a hollow passage in a wiper blade carrier cover to plurality of outlets aligned with passthroughs in the blade carrier through which fluid egresses from the wiper.

6 Claims, 30 Drawing Sheets

(56) References Cited

U.S. PATENT DOCUMENTS

| | | |
|---|---|---|
| 6,100,499 A | 8/2000 | Davila, Sr. |
| 6,119,300 A | 9/2000 | Schmid et al. |
| 6,133,546 A | 10/2000 | Bains |
| 6,140,608 A | 10/2000 | Stingone, Jr. |
| 6,199,300 B1 | 3/2001 | Heater et al. |
| 6,675,434 B1 | 1/2004 | Wilhelm et al. |
| 6,766,553 B2 | 7/2004 | Wilson |
| 6,836,924 B2 | 1/2005 | Egner-Walter |
| 6,892,417 B2 | 5/2005 | Franco et al. |
| 7,592,537 B1 | 9/2009 | West |
| 7,707,681 B1 | 5/2010 | Cabak |
| 8,157,187 B2 | 4/2012 | Shank et al. |
| 8,225,455 B1 | 7/2012 | Blus et al. |
| 8,240,320 B2 | 8/2012 | Mertins et al. |
| 8,301,020 B2 | 10/2012 | Wildegger |
| 8,381,348 B2 | 2/2013 | Egner-Walter et al. |
| 8,391,695 B2 | 3/2013 | Arkashevski et al. |
| 8,550,147 B2 | 10/2013 | Lansinger |
| 8,726,458 B1 | 5/2014 | Mahr et al. |
| 8,756,739 B1 | 6/2014 | Potter et al. |
| 8,771,432 B2 | 7/2014 | Meller et al. |
| D727,238 S | 4/2015 | Lepper et al. |
| 9,192,966 B2 | 11/2015 | Zanatta |
| 9,387,831 B2 | 7/2016 | Hartman |
| 9,440,621 B2 | 9/2016 | Egner-Walter et al. |
| 9,443,992 B2 | 9/2016 | Adler et al. |
| 9,452,736 B2 | 9/2016 | Egner-Walter et al. |
| 9,511,748 B2 | 12/2016 | Piotrowski et al. |
| 10,023,154 B2 | 7/2018 | Piotrowski et al. |
| 2002/0066473 A1 | 6/2002 | Levy et al. |
| 2002/0137455 A1 | 9/2002 | Ivanov et al. |
| 2003/0177599 A1 | 9/2003 | Wilson |
| 2004/0045587 A1 | 3/2004 | Franco et al. |
| 2007/0174989 A1 | 8/2007 | Moll et al. |
| 2008/0216274 A1 | 9/2008 | Egner-Walter |
| 2009/0151107 A1 | 6/2009 | Shank et al. |
| 2009/0172907 A1 | 7/2009 | Egner-Walter et al. |
| 2009/0283605 A1 | 11/2009 | Arkashevski et al. |
| 2010/0037415 A1 | 2/2010 | Lansinger |
| 2010/0043851 A1 | 2/2010 | Levy et al. |
| 2010/0293729 A1 | 11/2010 | Lee |
| 2011/0000525 A1 | 1/2011 | Wu et al. |
| 2011/0047738 A1 | 3/2011 | Gross et al. |
| 2011/0073143 A1 | 3/2011 | Levy et al. |
| 2011/0094542 A1 | 4/2011 | Gonzalez Rodriguez et al. |
| 2011/0094549 A1 | 4/2011 | Lin |
| 2011/0126378 A1 | 6/2011 | Ota |
| 2011/0167577 A1 | 7/2011 | Egner-Walter et al. |
| 2011/0185531 A1 | 8/2011 | Egner-Walter et al. |
| 2012/0005855 A1 | 1/2012 | Egner-Walter et al. |
| 2012/0120641 A1 | 5/2012 | Yassa |
| 2012/0125367 A1 | 5/2012 | Monkman et al. |
| 2012/0198646 A1 | 8/2012 | Kempfer et al. |
| 2012/0285516 A1 | 11/2012 | Mckarris |
| 2013/0097790 A1 | 4/2013 | Liao |
| 2013/0240005 A1 | 9/2013 | Ho et al. |
| 2013/0269140 A1* | 10/2013 | Egner-Walter ........ B60S 1/3862 15/250.04 |
| 2013/0306106 A1 | 11/2013 | Meller et al. |
| 2014/0007904 A1 | 1/2014 | Shapira et al. |
| 2014/0041138 A1 | 2/2014 | Adler et al. |
| 2014/0082879 A1 | 3/2014 | Criel et al. |
| 2014/0202492 A1 | 7/2014 | Grossman et al. |
| 2014/0209145 A1 | 7/2014 | Ting et al. |
| 2014/0310906 A1 | 10/2014 | Zanatta |
| 2014/0331434 A1 | 11/2014 | Shimoyama et al. |
| 2015/0001201 A1 | 1/2015 | Adler et al. |
| 2015/0258967 A1 | 9/2015 | Lepper et al. |
| 2015/0349706 A1 | 12/2015 | Grossman et al. |
| 2016/0304065 A1 | 10/2016 | Hartman |
| 2017/0093330 A1 | 3/2017 | Castellucci et al. |

FOREIGN PATENT DOCUMENTS

| | | |
|---|---|---|
| CN | 104307784 | 1/2015 |
| CN | 108832882 | 11/2018 |
| DE | 3309895 | 9/1984 |
| DE | 87 05 413 | 8/1987 |
| DE | 3617395 | 11/1987 |
| DE | 102004036094 | 2/2006 |
| DE | 102008051397 | 4/2010 |
| DE | 102010006531 | 8/2011 |
| EP | 2048455 | 4/2009 |
| EP | 2549199 | 1/2013 |
| EP | 2551610 | 1/2013 |
| EP | 2696150 | 2/2014 |
| GB | 1 432 557 | 4/1976 |
| JP | 05-262206 | 10/1993 |
| JP | 2011036833 | 2/2011 |
| KR | 10-2006-0132893 | 12/2006 |
| WO | WO 2005/075342 | 8/2005 |
| WO | 2007/000346 | 1/2007 |
| WO | WO 2007/015070 | 2/2007 |
| WO | 2008/005361 | 1/2008 |
| WO | WO 2009/013514 | 1/2009 |
| WO | 2010/034447 | 4/2010 |
| WO | 2011/004411 | 1/2011 |
| WO | 2011/133229 | 10/2011 |
| WO | 2012/123979 | 9/2012 |
| WO | 2014/001906 | 1/2014 |
| WO | 2014/022914 | 2/2014 |
| WO | 2014/080399 | 5/2014 |
| WO | 2014/143500 | 9/2014 |
| WO | 2014/163259 | 10/2014 |
| WO | WO 2016/197013 | 12/2016 |
| WO | 2017/044270 | 3/2017 |

OTHER PUBLICATIONS

Canadian Patent Application No. 2,807,317; Office Action dated Mar. 1, 2017, 5 pages total.

Canadian Patent Application No. 2,807,317; Office Action dated Aug. 29, 2018, 5 pages total.

Canadian Patent Application No. 2,807,317; Office Action dated Aug. 15, 2019, 6 pages total.

Chinese Patent Application No. 201680051869.6; Office Action dated Jun. 24, 2019, 9 pages total.

Korean Patent Application No. 10-2012-13257; Provisional Rejection dated May 30, 2017, 9 pages total.

European Patent Application No. 117723 64.3; Office Action dated Sep. 29, 2017, 7 pages total.

European Patent Application No. 11772364.3; Office Action dated Aug. 14, 2018, 6 pages total.

European Patent Application No. 11772364.3; Office Action dated Jan. 22, 2019, 8 pages total.

European Patent Application No. 11772364.3; Office Action dated Aug. 19, 2019, 6 pages total.

European Patent Application No. 16844876.9; Extended European Search Report dated Mar. 28, 2019, 10 pages total.

Mexican Patent Application No. MX/a/2012/012194; Office Action dated Jan. 5, 2017, 3 pages total.

United States U.S. Appl. No. 13/642,427; Office Action dated Sep. 11, 2014.

United States U.S. Appl. No. 13/642,427; Office Action dated Jun. 10, 2015.

United States U.S. Appl. No. 13/642,427; Office Action dated Dec. 18, 2015.

United States U.S. Appl. No. 15/194,147; Office Action dated Jan. 11, 2019.

United States U.S. Appl. No. 14/846,906; Office Action dated Feb. 6, 2019.

United States U.S. Appl. No. 14/846,906; Office Action dated Sep. 17, 2019.

PCT International Patent Application No. PCT/US20/12461; International Search Report and Written Opinion of the International Searching Authority dated Mar. 31, 2020, 11 pages.

(56) References Cited

OTHER PUBLICATIONS

PCT International Patent Application No. PCT/US19/63754; International Search Report and Written Opinion of the International Searching Authority dated Feb. 4, 2020, 12 pages.
U.S. Appl. No. 14/846,906, filed Sep. 7, 2015.
International Patent Cooperation Treaty Patent Application No. PCT/US2016/047419; International Search Report and the Written Opinion of the International Search Authority, dated Nov. 4, 2016, 11 pages total.
U.S. Appl. No. 15/194,147, filed Jun. 27, 2016.
U.S. Appl. No. 61/343,068, filed Apr. 23, 2010.
International Patent Cooperation Treaty Patent Application No. PCT/US2007/015181, filed Apr. 25, 2011.
auto123.com. Magic Vision Control from Mercedes-Benz. Website, http://www.auto123.com, originally downloaded May 25, 2012, 3 total pages.
Autovisuals. "Magic Vision Control" in the SL roadster. Website, http://autovisuals.com, originally downloaded May 25, 2012, 9 total pages.
Daimler. The new Mercedes-Benz SL: Lightweight, athletic, luxurious. Website, http://media.daimler.com, originally downloaded May 25, 2012, 1 page.
Just-Auto. Analysis: Mercedes' Magic Vision. Website, http://www.just-auto.com, originally downloaded May 25, 2012, 3 total pages.
Mercedes-Benz. Magic Vision Control adaptive windscreen washing system. Press Information dated Mar. 2012, 3 total pages.
U.S. Appl. No. 13/642,427, filed Oct. 19, 2012.
PCT International Patent Application No. PCT/US2011/000731; International Search Report and Written Opinion dated Jan. 18, 2012, 11 pages total.

* cited by examiner

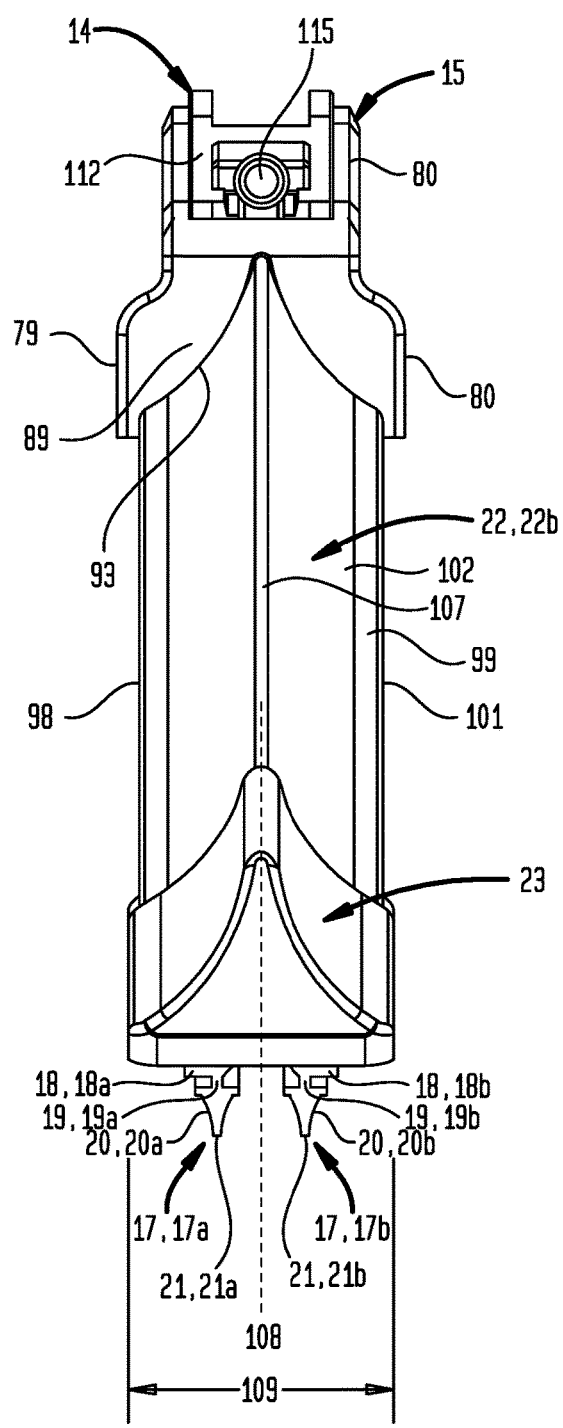
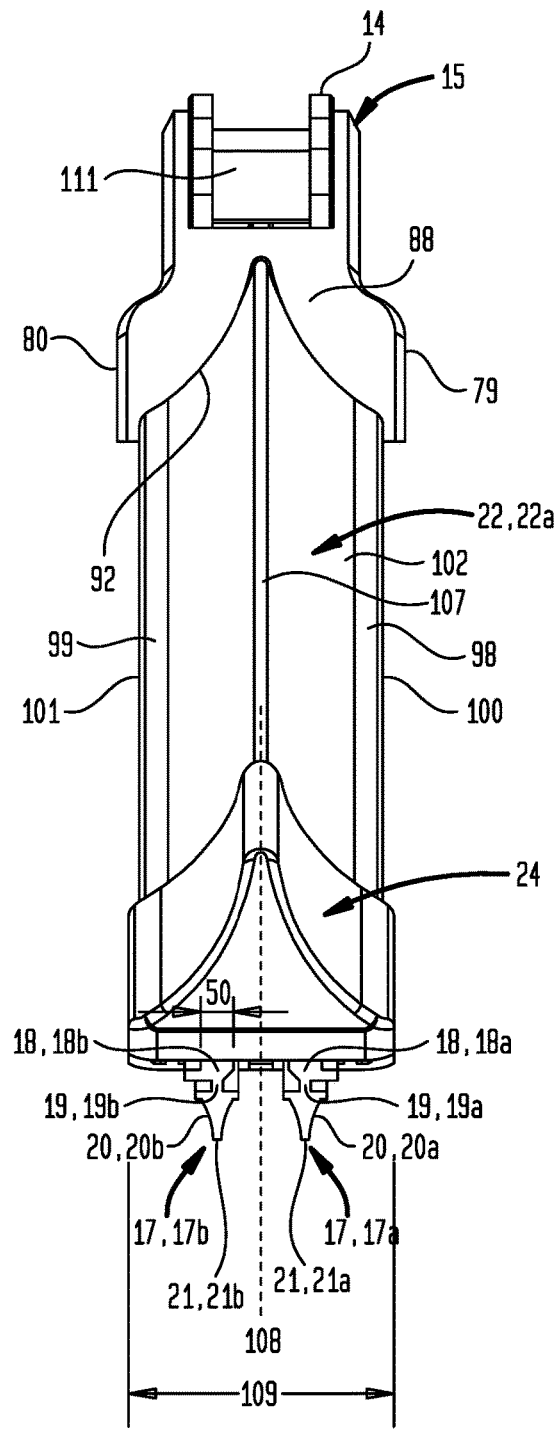

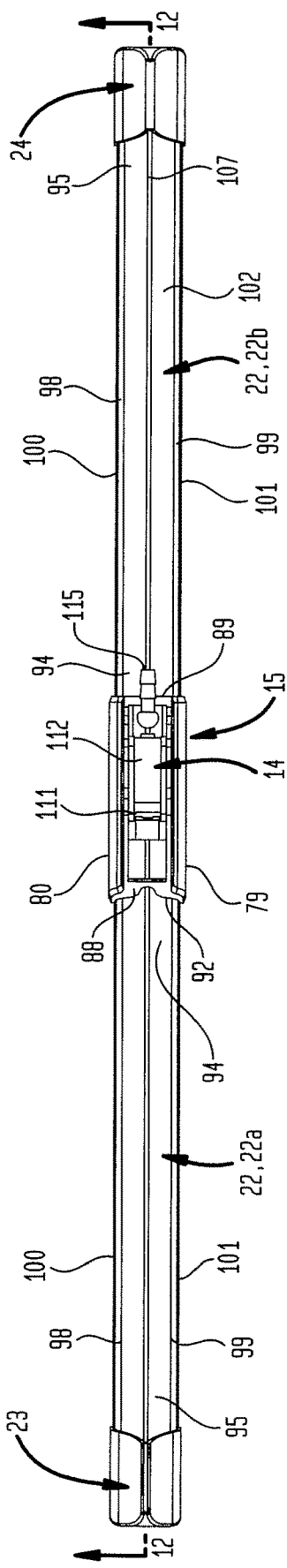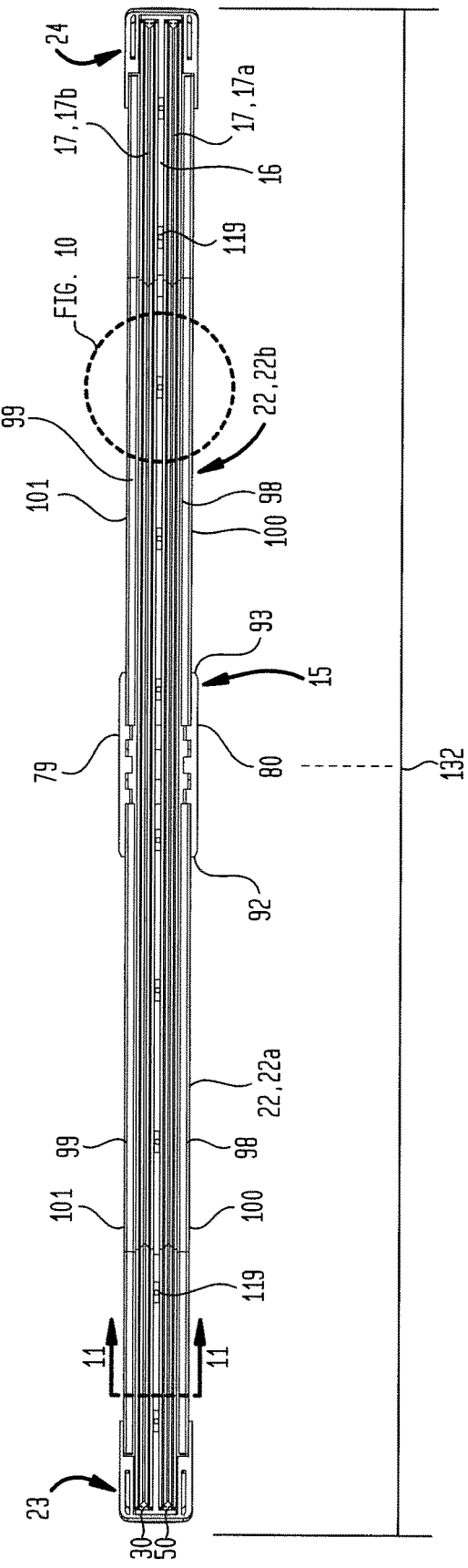

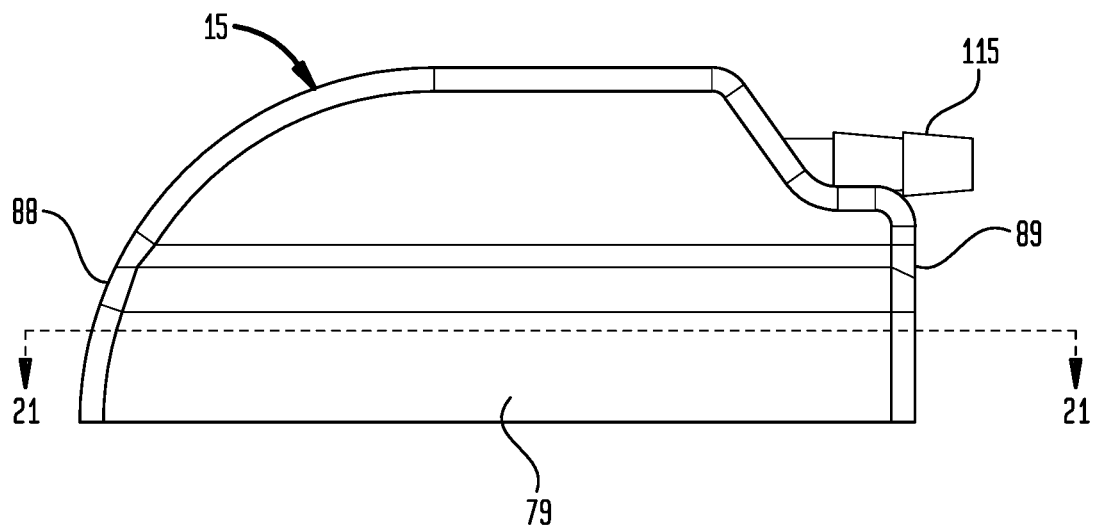
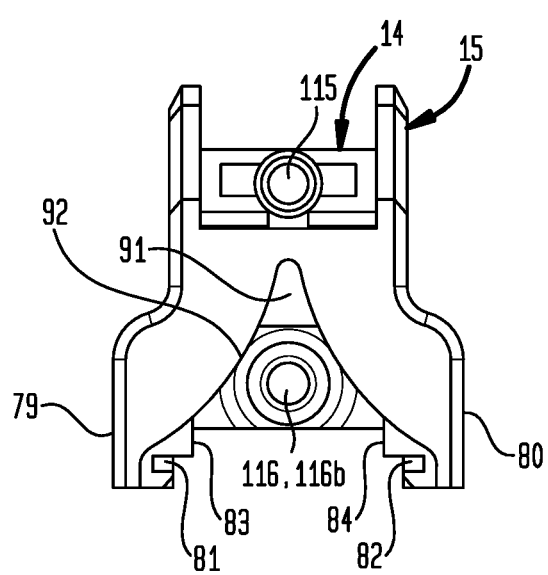
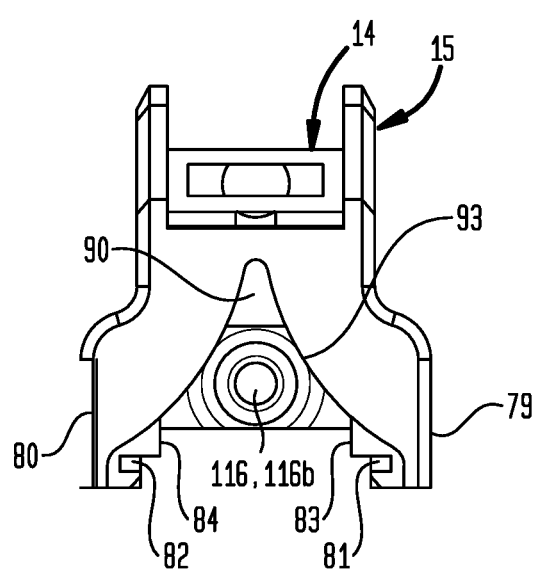

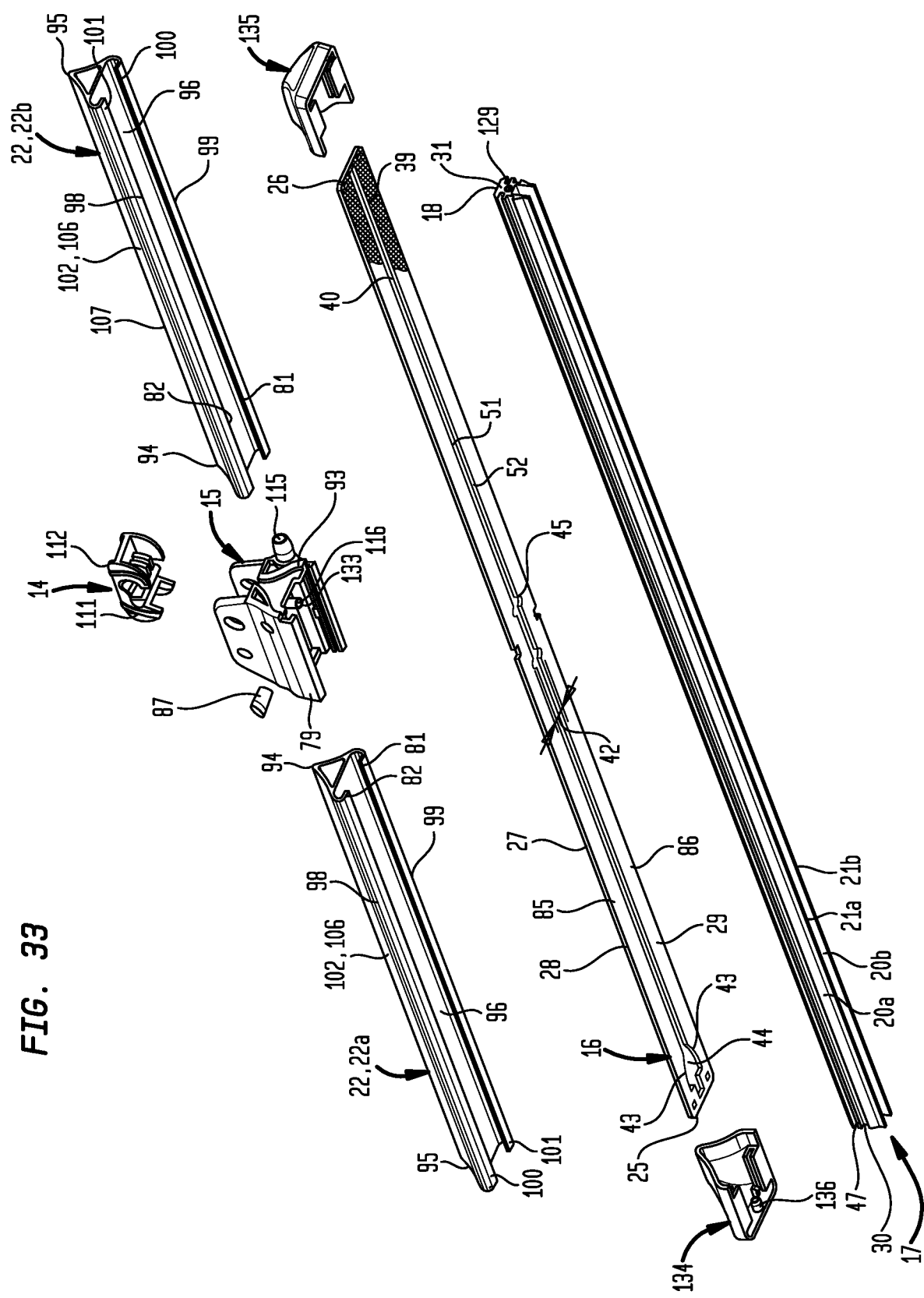

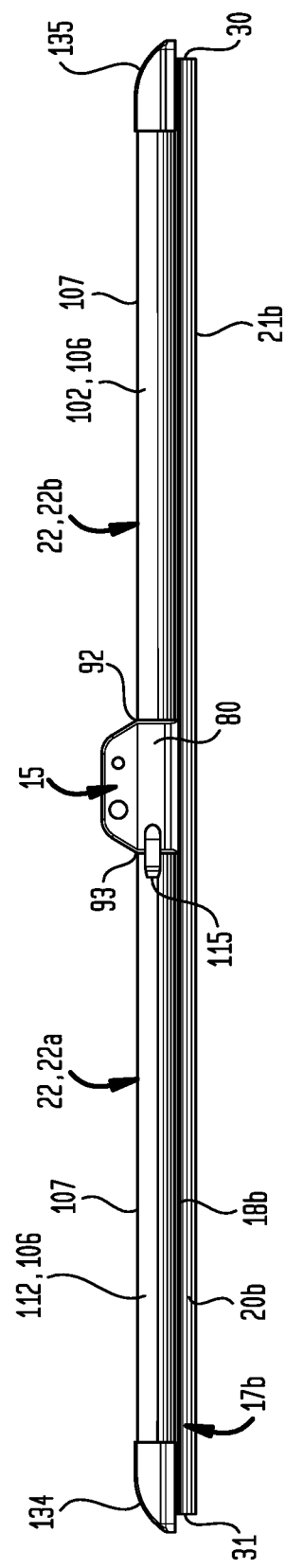

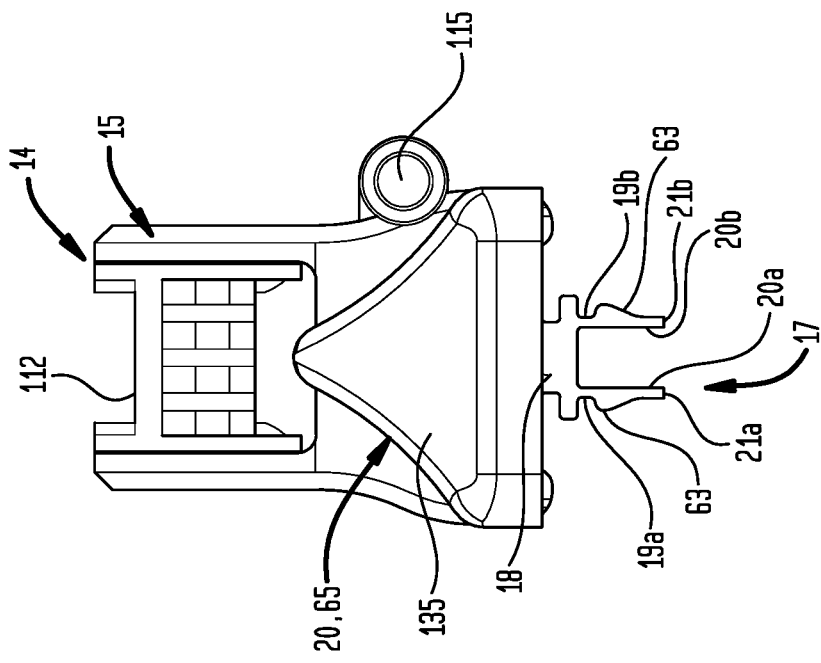
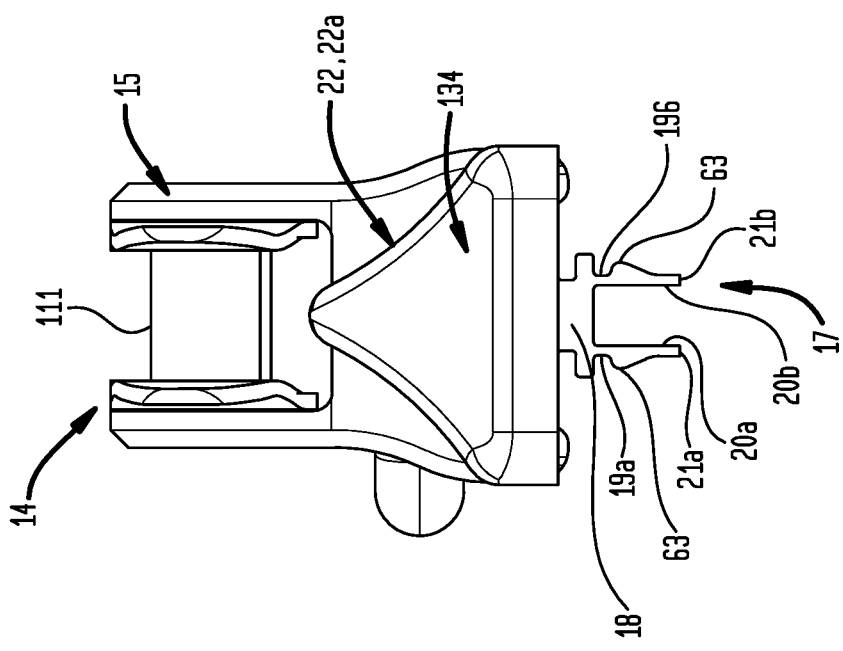

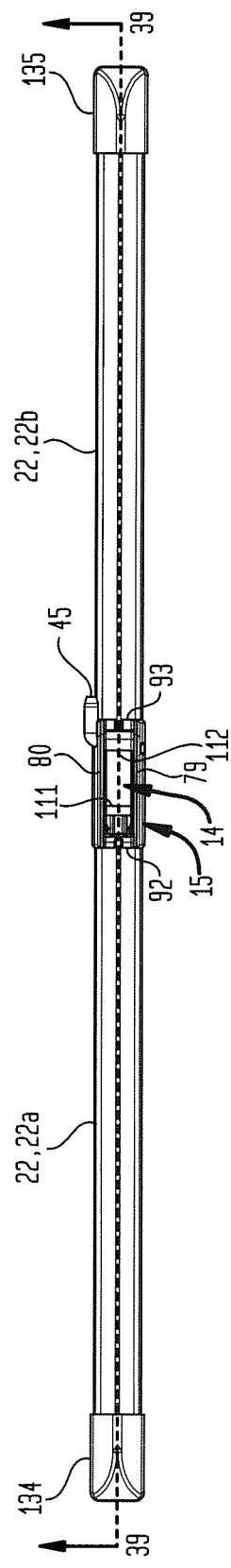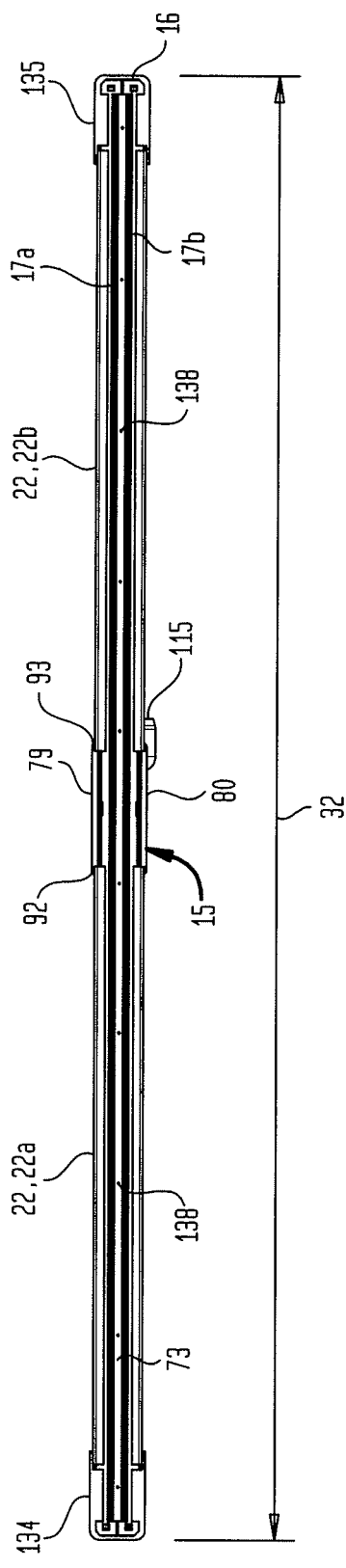

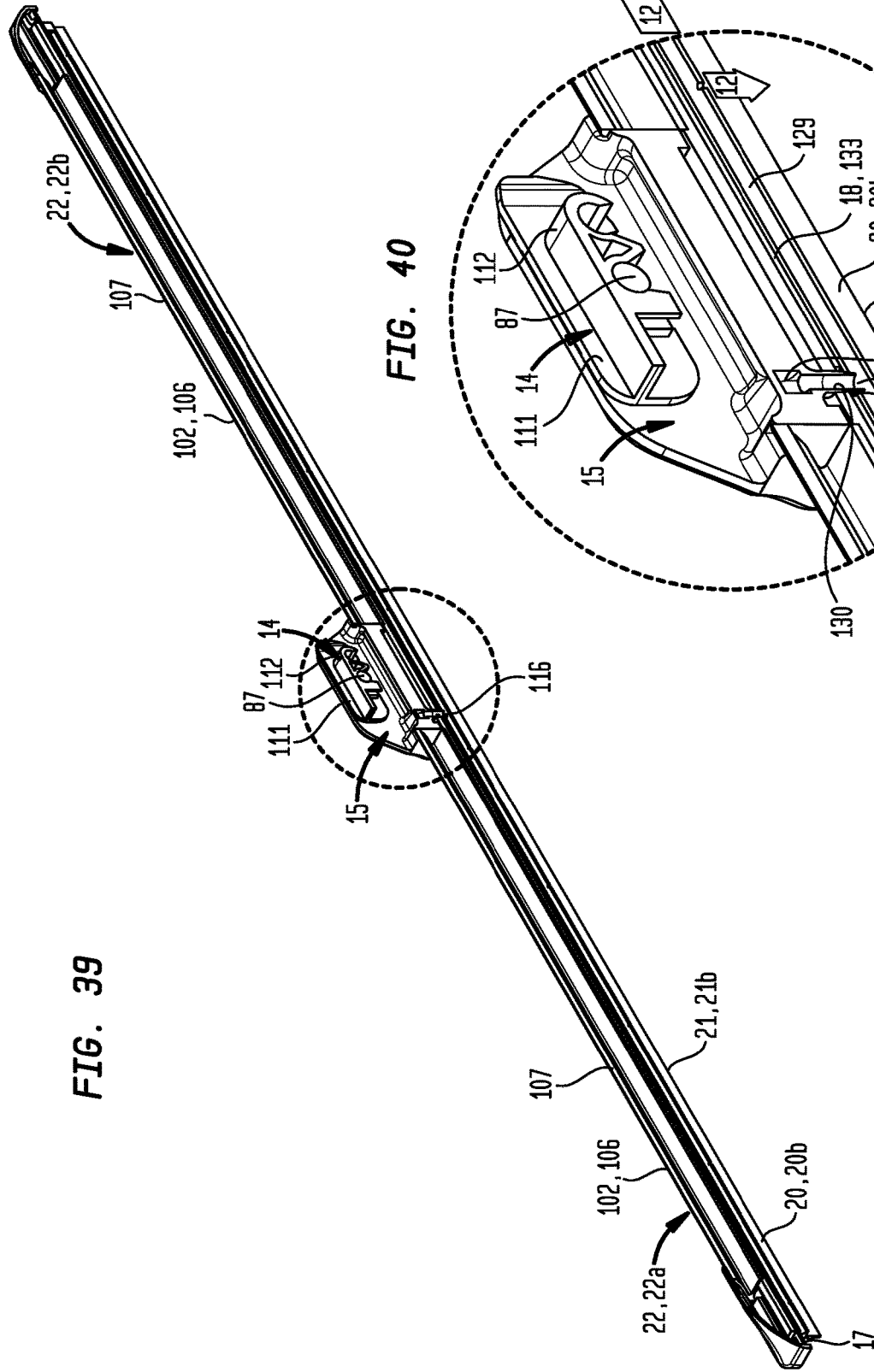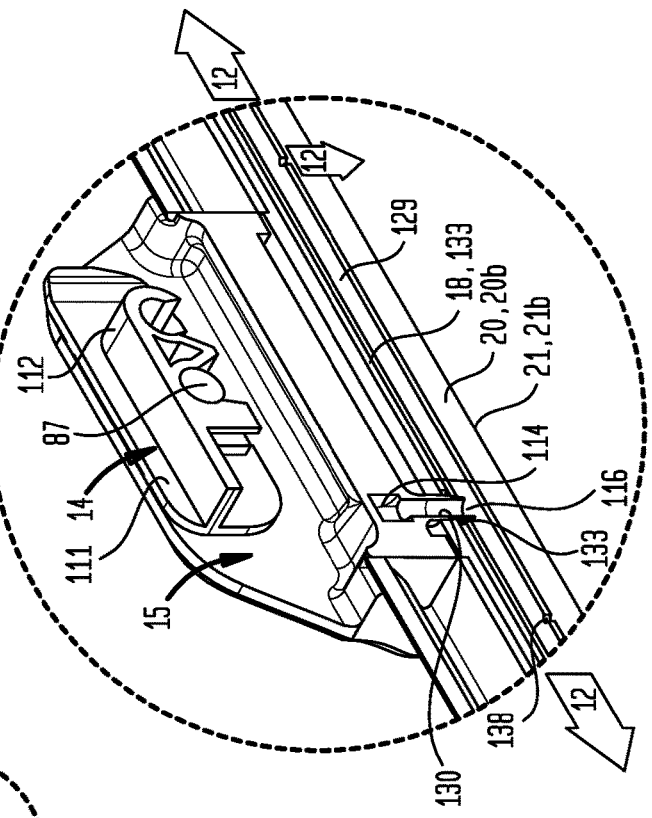

FIG. 66
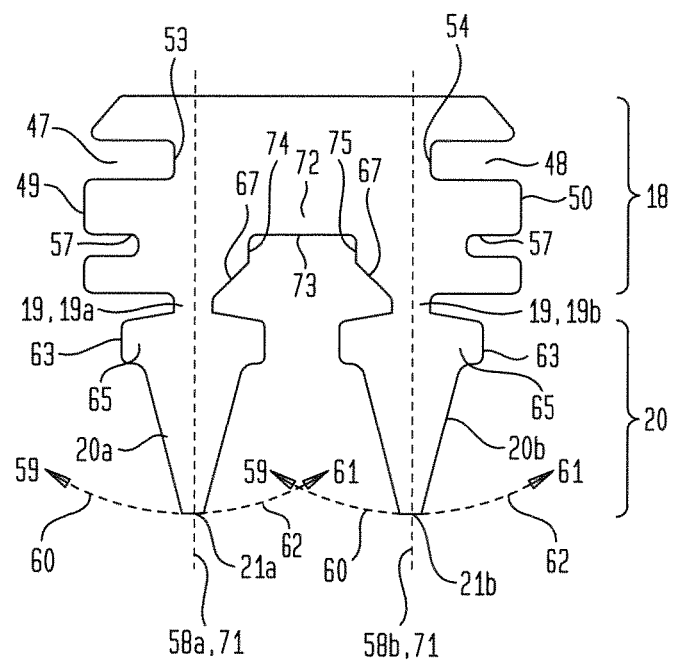
FIG. 67
FIG. 68
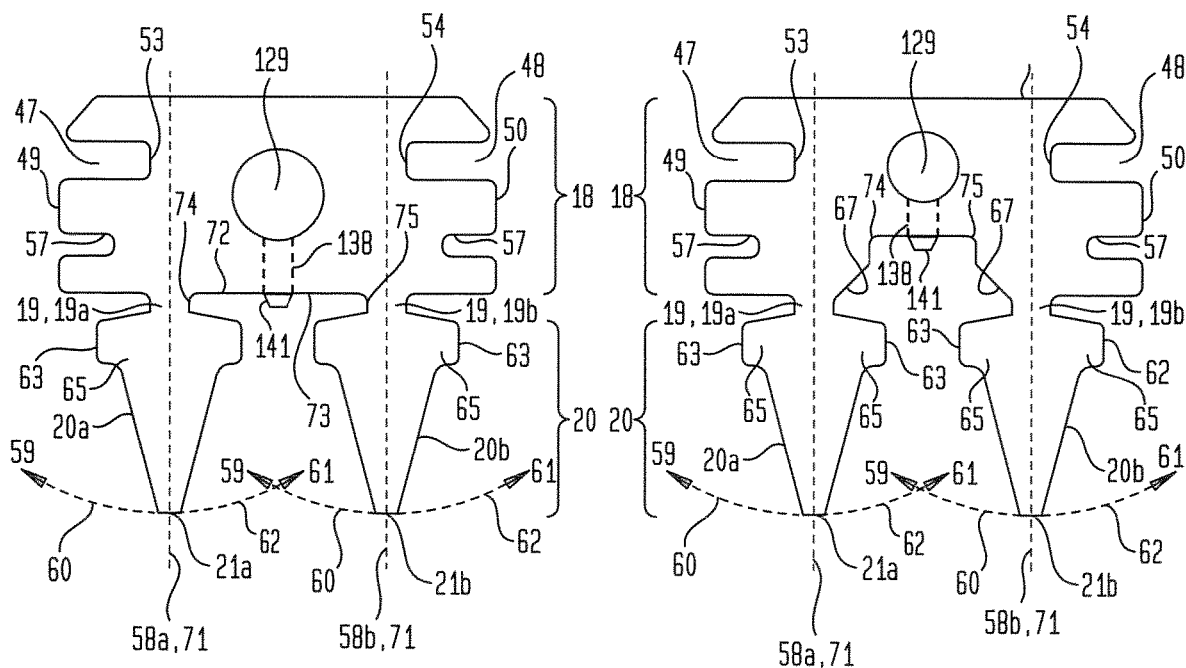

US 11,142,167 B2

WIPER BLADE WITH DIRECTIONALLY DIFFERENTIATED MOTION

This U.S. Non-Provisional Patent Application claims the benefit of U.S. Provisional Patent Application No. 62/789, 400, filed Jan. 7, 2019, and U.S. Provisional Patent Application No. 62/893,030, filed Aug. 28, 2019, each hereby incorporated by reference herein.

I. FIELD OF THE INVENTION

A wiper which carries one or more blades and may include an internal flow path which conducts fluid to plurality of outlets through which fluid egresses from the wiper.

II. SUMMARY OF THE INVENTION

A broad object of particular embodiments can be to provide a wiper blade including a base having a base first side opposite a base second side joined by a base face, the base first side or the base second side including a taper extending between the base first side or the base second side and the base face. A flexible member outwardly projects from the base face and extends between a base first end and a base second end. A sweep outwardly projects from the flexible member to terminate in a sweep terminal, wherein the flexible member flexes to allow the sweep terminal to travel from a resting position toward the taper or away from the taper, whereby the sweep engages the taper to delimit travel of the sweep toward the taper in a first degree arc and the sweep engages the base face to delimit travel of said sweep away from the taper in a second degree arc.

Another broad object of particular embodiments can be to provide a wiper blade including a base having a base first side opposite a base second side joined by a base face. A pair of flexible members outwardly project in spaced apart relation from the base face and extending between a base first end and a base second end. A pair of sweeps correspondingly outwardly projecting from said plurality of flexible members to terminate in a corresponding pair of sweep terminals. A channel disposed in the base face between the pair of flexible members, wherein said channel has a channel base joining first and second of channel sides extending to the base face, wherein the first and second channel sides taper approaching the channel base, whereby the pair of flexible members flex to allow each of the pair of sweep terminals to travel from a resting position toward said taper or away from said taper of said first or second channel sides, a first one of said pair of sweeps engaging said taper of said first channel side to delimit travel of said sweep in a first wiping direction and a second one of said pair of sweeps engaging said taper of said second channel side to delimit travel of said sweep in a second wiping direction.

Another broad object of particular embodiments can be to provide a wiper including a wiper bracket having bracket passage disposed between a bracket inlet and pair of bracket outlets disposed in opposite outward facing relation. A blade carrier can be coupled to the wiper bracket, wherein the blade carrier has a first side opposite a second side joined at a blade carrier periphery. The blade carrier can include one or more blade supports, and one or more passthroughs through which fluid can egress. A pair of blade carrier covers can each include an axial hollow passage having one or more outlets. The pair of blade carrier covers can be coupled to the blade carrier having each hollow passage connected to one of the pair of bracket outlets with the one or more outlets aligned with said one or more blade carrier passthroughs. One or more blades corresponding retained in said one or more blade supports. A fluid can be conveyed through the bracket passage to the axial hollow passage of each blade carrier covers to egress from the one or more outlets and through the one or more passthrough to be delivered from the wiper to a wipeable surface.

Naturally, further objects of the invention may be disclosed throughout other areas of the specification, drawings, photographs, and claims.

III. A BRIEF DESCRIPTION OF THE DRAWINGS

FIG. 6 is a first end view of the particular embodiment of the wiper shown in FIG. 4.

FIG. 7 is a second end view of the particular embodiment of the wiper shown in FIG. 4.

FIG. 8 is a top plan view of the particular embodiment of the wiper shown in FIG. 4.

FIG. 9 is a bottom plan view of the particular embodiment of the wiper shown in FIG. 4.

FIG. 15 is an elevation view of a wiper bracket of the wiper shown in FIG. 4.

FIG. 16 is a first end view of the wiper bracket shown in FIG. 15.

FIG. 17 is a second end view of the wiper bracket shown in FIG. 15.

FIG. 33 is an exploded view of another particular embodiment of the wiper and method of assembly.

FIG. 34 is side elevation view of the wiper shown in FIG. 34.

FIG. 35 is a first end view of the wiper shown in FIG. 34.

FIG. 36 is a second end view of the wiper shown in FIG. 34.

FIG. 37 is top plan view of the wiper shown in FIG. 34.

FIG. 38 is a bottom plan view of the wiper shown in FIG. 34.

FIG. 39 is a cross section view 39-39 of the wiper shown in FIG. 37.

FIG. 40 is an enlarged portion of the cross section view shown in FIG. 39.

FIG. 66 is an end view of another particular embodiment of a wiper blade having a pair of sweeps extending from a blade base and a channel disposed between the pair of sweeps having inward taper of the channel sidewalls approaching the channel base.

FIG. 67 is an end view of another particular embodiment of a wiper blade having a pair of sweeps extending from a blade base and having a hollow passage disposed in the blade base and an outlet extending from the hollow passage open at an external surface of the blade base between the pair of sweeps.

FIG. 68 is an end view of another particular embodiment of a wiper blade having a pair of sweeps extending from a blade base and a channel disposed between the pair of sweeps having inward taper of the channel sidewalls approaching the channel base and having a hollow passage disposed in the blade base and an outlet extending from the hollow passage open at an external surface of the blade base between the pair of sweeps.

Figure 69:
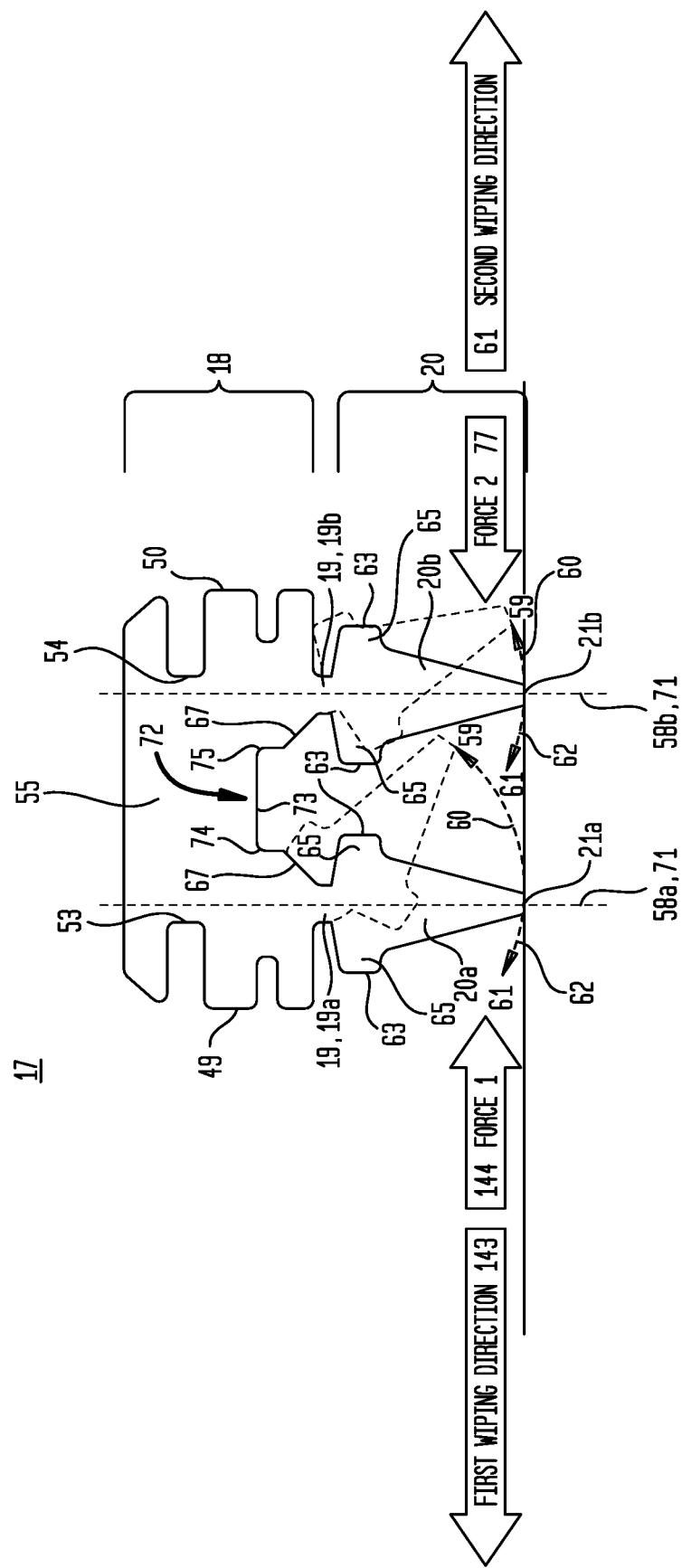

FIG. 69 is an illustration of a method of using an embodiment of wiper blade shown in FIG. 66.

IV. DETAILED DESCRIPTION OF THE PREFERRED EMBODIMENTS

The Wiper System. Now referring primarily to FIGS. 1 and 2, in general overview the wiper system (1) includes a wiper (2) which moves to wipe a wipeable surface (3). As shown in the illustrative example of FIG. 1, the wiper (2) can be utilized to wipe a windshield (4) of a vehicle (5); however, it is not intended that this illustrative example preclude embodiments of the wiper (3) or methods of using the wiper (2) to wipe a wipeable surface (3) other than the windshield (4) of a vehicle (5), and embodiments of the wiper (2) can be used to wipe the wipeable surface (3) of numerous and varied movable and stationary objects, such as: solar panels, glazing in windows, building or pavement surfaces. Embodiments of the wiper (2) can be pressingly engaged and moved across a wipeable surface (3) to engage wipeable materials (6), such as: solids, semisolids, or liquids in the form of particulate, sludge, grim, dirt, droppings, sap, rain, cleaners, disinfectants, ice, frost, or the like. The wipeable materials (6) engaged by movement of the wiper (2) over the wipeable surface (3) can be moved in whole or in part over or from the wipeable surface (3) engaged by the wiper (2).

Figure 1:
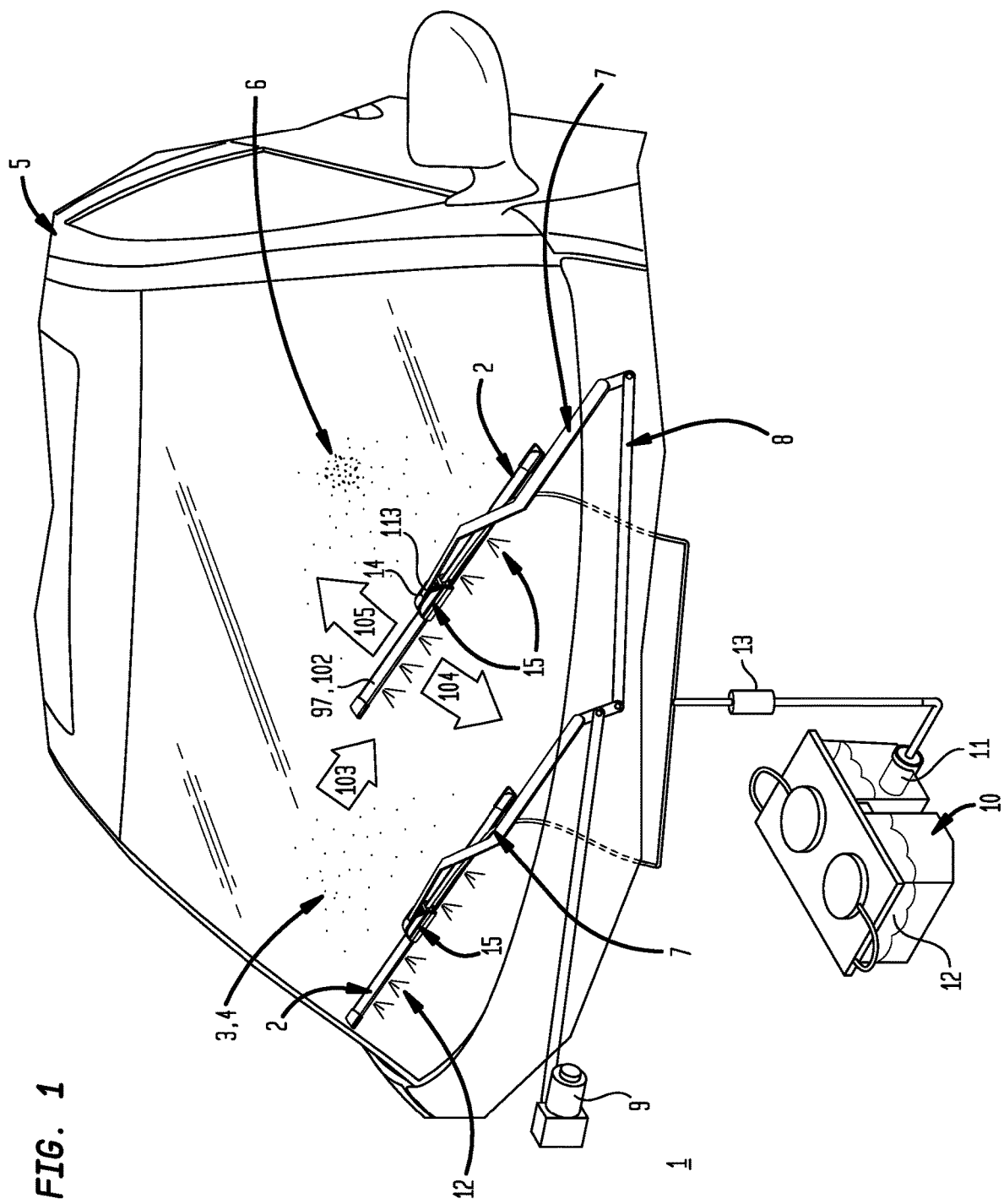
FIG. 1 is an illustration of a particular embodiment of the wiper system and method of use to wipe a wipeable surface.
Figure 2:
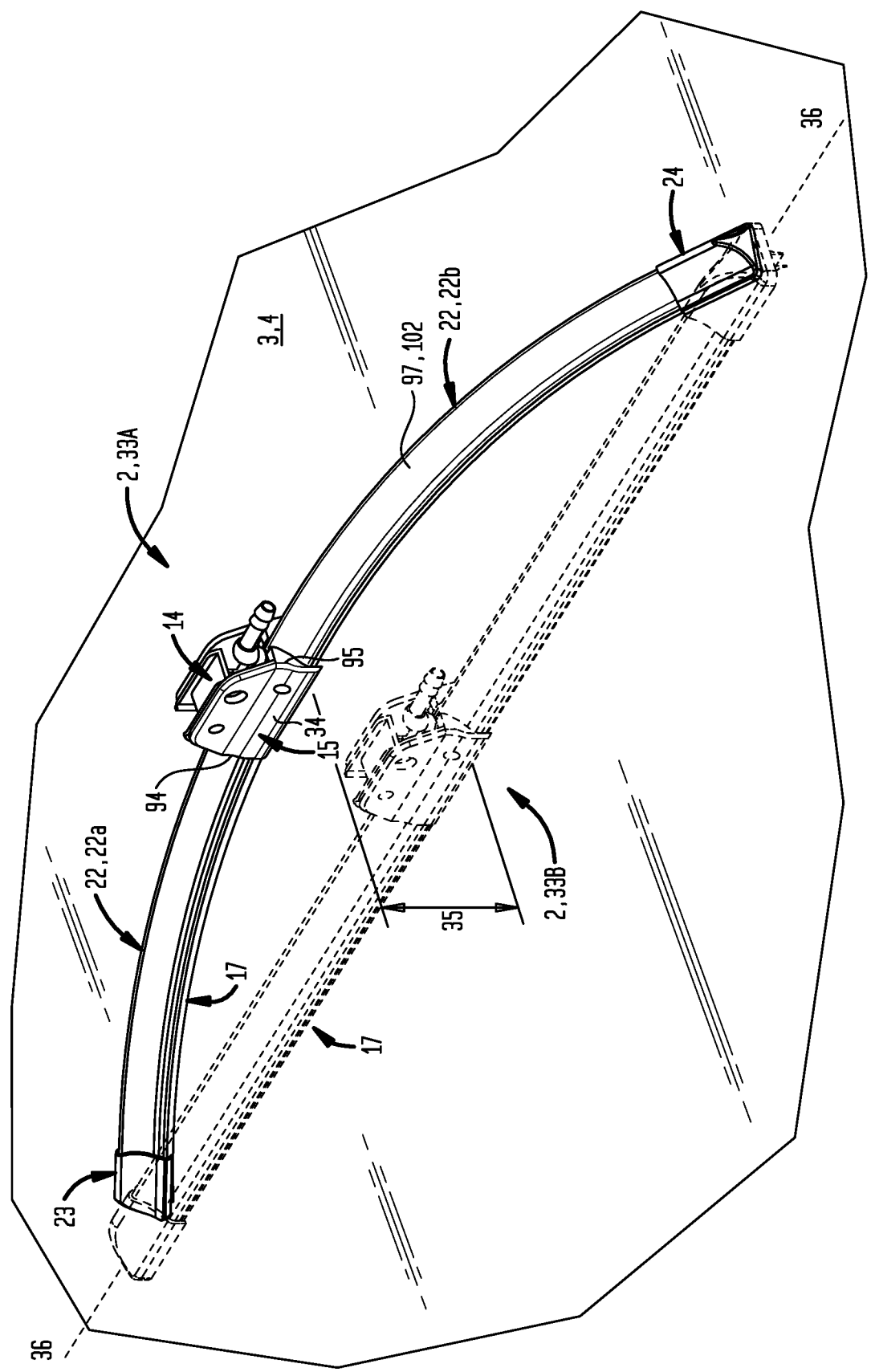
FIG. 2 is an illustration of a particular embodiment of a wiper which can be utilized in the wiper system having resilient flexure.

Again, with primary reference to FIGS. 1 and 2, the wiper (2) can, but need not necessarily, be connected to a wiper arm (7). The wiper arm (7) can be configured to urge the wiper (2) against and move the wiper (2) across the wipeable surface (3). A wiper arm movement assembly (8) can be coupled to the wiper arm (7). Operation of the wiper arm movement assembly (8) generates movement of the wiper arm (7) and corresponding generates movement of the wiper (2) in relation to the wipeable surface (3). In particular embodiments, such as motor vehicles (5), conventional wiper arms (7) and conventional wiper arm movement assemblies (8) can be utilized with embodiments of the inventive wiper (2). In particular embodiments, the wiper arm (7) can be coupled to a motor (9) through a series of mechanical components, such as a one or more conventional 4-bar linkages in series or in parallel. Vehicles (5) with air operated brakes sometimes utilize air operated wiper arms (7), run by bleeding a small amount of air pressure from the brake system to a small air operated motor mounted just above the windshield. These wiper arms (7) are activated by opening a valve which allows pressurized air to enter the motor. Vehicles (5) with a vacuum manifold can drive a vacuum motor. On the certain vehicles (5), the wiper arm (7) can be driven by a cable connected to the transmission. Certain wiper arm movement assemblies (8) are not powered, but rather, provide a handle which allows movement by application of hand power. These examples of the wiper arm (7) and wiper arm movement assemblies (8) are not intended to be limiting but rather illustrative of the numerous and varied wiper arm movement assemblies (8) which can be utilized to move wiper arms (7) connected to embodiments of the inventive wiper (2) in relation to a wipeable surface (3). Embodiments of the wiper (2) can be configured to retrofit conventional wiper arms (7) of vehicles (5). Particular embodiments of the wiper system (1) can further include a fluid reservoir (10) and fluid pump (11) to generate a flow of fluid (12) onto the wipeable surface (3) or through the wiper (2) to the wipeable surface (3). In particular embodiments, the wiper system (1) can further include a fluid heater (13) which transfers heat to the flow of fluid (11).

The Wiper. Generally, with reference to FIGS. 1 through 69, embodiments of the inventive wiper (2) can include one or more of: a wiper arm connector (14), a wiper bracket (15) adapted to couple to a blade carrier (16) which can carry one or more wiper blades (17) (also referred as "a blade" or "blades"). Each blade (17) can include one or more of: a wiper blade base (18) (also referred to as the "base"), one or more flexible members (19) outwardly extending from the base (18), and one or more sweeps (20) correspondingly outwardly projecting from the base (18) or one or more flexible members (19) to terminate in a sweep terminal (21). A blade carrier cover (22) can be disposed on the blade carrier (16). A pair of end caps (23)(24) can, but need not necessarily, be coupled to a corresponding wiper blade base first and second ends (30)(31) or blade carrier first and second ends (25)(26).

The Blade Carrier. Now, with general reference to FIGS. 1-69 and with primary reference to FIGS. 3, 4 and 33, embodiments of the wiper (2) include a blade carrier (16) having blade carrier periphery (27) joining opposite blade carrier sides (28)(29) which extend to corresponding blade carrier first and second ends (25)(26). In particular embodiments, the blade carrier (16) can have a blade carrier length (32) disposed between blade carrier first and second ends (25)(26). In particular embodiments, a resilient blade carrier (16) can have a blade carrier periphery (27) which joins opposite convex and concave blade carrier sides (28)(29) which extend to corresponding blade carrier first and second ends (25)(26). The amount of curvature in the resilient blade carrier (16) in the unflexed condition (33A) (as shown in the example of FIG. 2 in solid object lines) can be lesser or greater depending upon the application and the dimensions of the wipeable surface (3) engaged by the wiper (2). In particular embodiments useful to wipe automotive windshields (4) of automotive vehicles (5), the blade carrier length (23) can occur in a range of about 200 millimeters to about 1000 millimeters (millimeters also referred to as "mm"); although, the recitation of numerical ranges by endpoints herein includes all the numeric values subsumed within that range. Additionally, this illustrative example is not intended to obviate embodiments having a lesser or greater blade carrier length (32). In particular embodiments, the blade carrier length (32) can be about 500 mm to about 550 mm. In particular embodiments, the curvature of the arcuate blade carrier (16) in an unflexed condition (33A) can dispose a center point (34) of the arcuate blade carrier (16) at a distance (35) outward of a blade carrier longitudinal axis (36) passing through the arcuate blade carrier first and second ends (25)(26) in a flexed condition (33B) (as shown in the example of FIG. 2 broken line). The distance (35) can occur in the range of nearly zero mm to about one half the length of the arcuate blade carrier (16). In particular embodiments, the distance (35) can occur in the range of about 20 mm to about 100 mm; although these illustrative examples are not intended to preclude embodiments having greater or lesser distance (35) or curvature of the blade carrier (16).

In particular embodiments, the resilient curvature of the blade carrier (13) can be imparted by utilizing a resilient metal (37) which can, but need not necessarily, be a spring steel, such as IS:2507-1975 grade 75C6 which can have a hardness occurring in the range of about 50 to about 65 Rockwell Hardness ("HRC"). Depending on the amount of flexure or resilience to be imparted in the arcuate blade carrier (16) the spring steel can be a sheet spring steel having a sheet thickness of about 0.7 mm to about 0.9 mm and particular embodiments can have a sheet thickness of about 0.8 mm. In particular embodiments, the blade carrier (13) can have a blade carrier width (38) occurring in the range of about 15 mm to about 25 mm, with particular embodiments have a blade carrier width (38) of about 20 mm. The resilient metal (37), such as spring steel can, but need not necessarily, be further include a coat (39) to inhibit formation of rust. As an illustrative example, the coat (39) can, but need not necessarily, be disposed by being plated (for example electroplated with Zinc or Zinc-Nickel alloy), powder coated, painted, or combinations thereof. The amount of resilience in the blade carrier (16) can be adjusted by varying one or more of the metal type, the metal hardness, the sheet thickness, the blade carrier width, or the amount of curvature, or combinations thereof, to allow a level of conformable wiping engagement of the wiper (2) with a wipeable surface (3) during operation of the wiper system (1). The illustrative example of utilizing spring steel in the production of the blade carrier (16) is not intended to preclude embodiments in which other materials having equivalent or similar properties to spring steel are utilized, such as polyurethane plastic, aluminum, titanium, or combinations thereof.

The Blade Support. Now, with general reference to FIGS. 1 through 69 and with primary reference to FIGS. 3, 4 and 33, embodiments of the blade carrier (16), can further include one or more blade supports (40). In the embodiments shown in FIGS. 3 and 4, the blade carrier (16) includes or consists of a pair of blade supports (40a)(40b) extending along the longitudinal blade carrier length (32); however, this is not intended to preclude embodiments which include one blade support (40) as shown in the example of FIG. 33. In particular embodiments including two or more blade supports (40), the blade supports (40) can, but need not necessarily, be disposed in generally parallel relation or linear parallel relation; however, this is not intended to preclude embodiments in which a plurality of blade supports

(40) are disposed in non-parallel relation to each other. As shown in the examples of FIGS. 3 through 32, particular embodiments can include a pair of blade supports (40a)(40b) disposed a distance apart extending along the longitudinal blade carrier length (32) between the blade carrier first and second ends (25)(26) in generally linear parallel relationship. The blade supports (40) can, but need not necessarily, comprise or consist of one or more elongate slots (41) configured to correspondingly receive or removably receive one or more wiper blades (17). In the embodiments shown in the Figures, the elongate slot can be open between opposite blade carrier sides (28)(29). In particular embodiments, the slot (41) can have a slot width (42) which occurs in the range of about 1.0 mm to about 2.0 mm, with particular embodiments having slot width (42) of about 1.4 mm. Each blade carrier support (40) can, but need not necessarily, terminate in a blade support guide (43) which defines a support guide aperture (44) open to blade carrier first and second sides (30)(31) of the blade carrier (16) having sufficient open area to allow ingress or allow egress of a blade base (18) of a blade (17) configured to slidably mateably engage the blade support (40).

The Blade Carrier Passthrough. Now, with general reference to FIGS. 1 through 69 and with primary reference to FIGS. 4 and 33, the blade carrier (13) can, but need not necessarily, include one or more blade carrier passthroughs (45) open to opposite blade carrier sides (28)(29). The blade carrier passthroughs (45) can be disposed in the blade carrier (16) to allow passage of fluid (12) through the blade carrier (16). In particular embodiments, in which the blade carrier (16) carries one wiper blade (17) the blade carrier passthrough (45) can be disposed on either or both sides of the blade support (40). In particular embodiments, in which the blade carrier (16) includes a pair of blade supports (40a)(40b) to correspondingly carry a pair of blades (17a)(17b), the blade carrier passthrough (45) can, but need not necessarily, be disposed medially between the pair of blade supports (40a)(40b) and corresponding between the first blade (17a) and the second blade (17b) installed on the blade carrier (16). As shown in the illustrative examples of FIGS. 4 and 33, the blade carrier passthrough (45) can be disposed on the medial longitudinal axis (36) of the blade carrier (16) between a first blade support (40a) and a second blade support (40b). Embodiments of the blade carrier passthrough (45) can take the form of one or a plurality of passthrough apertures (45) disposed in the blade carrier (16) to allow the passage of fluid (12) through the blade carrier (16). In the embodiments shown in the FIGS. 4 and 33, the blade carrier passthroughs (45) comprises a plurality elongate slots (46) disposed along the medial longitudinal axis (36) of the blade carrier (16) between a pair of blade supports (40a)(40b) configured to receive or removably receive a corresponding pair of blades (17a)(17b). The plurality of elongate slots (46) can, but need not necessarily, each have a slot length (46a) occurring in the range of about 10 mm to about 100 mm and slot width (46b) occurring in the range of about 1.0 mm to about 3.0 mm; however, this is not intended to preclude embodiments in which the blade carrier passthroughs (45) comprises elongate slots of greater or lesser slot length (46a) or slot width (46b), or comprise or consist of one or more apertures having an aperture periphery which defines a circle, an oval, an ellipse, a rectangle, a square or other configuration which affords an aperture of sufficient open area to allow a flow of fluid (12) through the blade carrier (16).

The Blades. Now, with general reference to FIGS. 1 through 69 and with primary reference to FIGS. 62 through 69, illustrative examples of blade (17) configurations that can be used in embodiments of the wiper (2) are shown in end view or cross section view; however, these illustrative examples are not intended to preclude the use of other blade configurations, and even conventional blade configurations, in particular embodiments of the wiper (2). Embodiments of the wiper (2) can include one blade (17), a pair of blades (17a)(17b), or a plurality of blades (17) configured to be received or removably received by a corresponding one, a pair, or a plurality of blade supports (40) disposed in the blade carrier (16). In particular embodiments, the one, the pair or the plurality of blades (17) can extend outward of the blade carrier first side (28) of the blade carrier (16) (shown in FIGS. 3 and 4 as the concave side of the blade carrier (16)), while in other particular embodiments the one, the pair, or the plurality of blades (17) can extend outward of the carrier second side (29) (shown in FIGS. 3 and 4 as convex side of the blade carrier (16)) depending upon the corresponding configuration of the wipeable surface (3); however, as shown in the illustrative example FIG. 33 the blade carrier (16) can be generally flat, the embodiment of FIG. 33 can be arcuate as shown and described in the examples of FIGS. 3 and 4.

The Wiper Blade Base. Now with general reference to FIGS. 1 through 69 and with primary reference to FIGS. 62 through 69, embodiments of the wiper blade (17) can include a wiper blade base (18) configured to be received or removably received by the blade support (40) of the blade carrier (16). In particular embodiments, the base (16) disposed in the blade support (40) can extend outward of a blade carrier first side (28), while in other particular embodiments the base (16) can extend outward of a blade carrier second side (29) depending upon the corresponding configuration of the wipeable surface (3). In particular embodiments of the base (18) can be configured to slidably engage the blade support (40) to receive or removably receive the base (18) in the blade support (40); however, this does not preclude embodiments of the base (18) immovably fixed in the blade support (40) or which interference fit or snap fit into the blade support (40). In particular embodiments, a pair of base channels (47)(48) can be correspondingly disposed in a base first side (49) disposed in opposed relation to a base second side (50). The pair of base channels (47)(48) slidably receive corresponding opposed blade support peripheral margins (51)(52) of the blade support (40). In particular embodiments, the base channels (47)(48) can be disposed in the base first side (49) and base second side (50) to locate a pair of base channel bottoms (53)(54) in opposed relation a distance apart to define a medial partition (55) of the blade base (18) having a medial partition width (56) lesser than the slot width (42) of the corresponding blade support (40). In particular embodiments, the base (18) can further include one or more axial grooves (57) in the base first side (49) or base second side (50) to provide greater or a lesser lateral flexure in the base (18).

The Flexible Member. Now with primary reference to FIGS. 62 through 69, embodiments of the wiper blade (17) can, but need not necessarily, include one or more flexible members (19) outwardly extending from the base (18) between base first and second ends (30)(31). The flexible member (19) can be a continuous flexible member extending along the entire or part of the length of the base (18) between base first and second ends (30)(31), or can be a plurality of flexible members (19) disposed in space apart relation along the length of the base (18) between first and second ends (30)(31).

The Sweeps. Now with primary reference to FIGS. 62 through 69, a sweep (20) can outwardly project from the base (18) to terminate in a sweep terminal (21). The sweep width (57) can taper approaching the sweep terminal (21). The flexible member (19) can, but need not necessarily, couple the sweep (20) to the base (18). The flexible member (19) can flex during movement of the wiper (2) allowing the sweep terminal (21) to travel from a sweep resting position (58) in a first direction (59) through a first degree arc (60) or from the sweep resting position (58) in a second direction (61) through a second degree arc (62). The flexible member (19) can be sufficiently resilient to bias travel of the sweep (20) toward the sweep resting position (58) absent any opposing force on the sweep (20).

The Sweep Stop. Now with primary reference to FIGS. 62 through 69, in particular embodiments, the sweep (20) can be configured to include a sweep stop (63) which upon flexure of the flexible member (19) engages the base (18) to delimit travel of the sweep (20) from the sweep resting position (58) in a first direction (59) through a first degree arc (60) or in a second direction (61) through a second degree arc (62), or combinations thereof. In particular embodiments, the sweep stop (63) can comprise the sweep face (64) attached to the flexible member (19). The sweep face (64) on one or both sides of the flexible member (19) can be configured to engage the base (18) upon flexure of the flexible member (19) to delimit travel of the sweep terminal (21) from the sweep resting position (58) through a greater or lesser first or second degree arc (60)(62) depending on the application. In the illustrative examples of FIGS. 62 and 64, the sweep stop (63) includes a stop member (65) extending outward of one or both sides of the sweep (20) which correspondingly outwardly extends the sweep face (64) on one or both sides of the flexible member (19). In particular embodiments the sweep face (64) can be angled or curved toward or way from the base (18) to a greater or lesser extent to allow incremental variation in fixed configuration of the sweep stop (63) to afford correspondingly incremental variation in pre-determined first or second degree arcs (60)(62) through which the sweep terminal (21) travels delimited by engagement of the stop element (65) with the base (18). In particular embodiments, the sweep stop member (63) can be configured to allow travel of the sweep (20) in a first direction (59) from the sweep resting position (58) through a first degree arc (60) and in an opposite second direction (61) from the sweep resting position (58) through a second degree arc (62). The stop member (63) can be configured to establish travel of the sweep terminal (21) in the first direction (59) in a first degree arc (60) which can facilitate removal of wipeable materials (6) and can be configured to establish travel of the sweep terminal (21) in a second direction (61) in a second degree arc (62) to facilitate return of the wiper (2) to the initial position of the wiper (2).

The Directionally Differentiated Arc. Now, with primary reference to FIGS. 62 through 69, in particular embodiments, the stop member (63) can be configured to allow the first degree arc (60) and the second degree arc (62) to include the same or similar degrees of arc (66). In other embodiments, the stop member (63) can be configured to allow the first degree arc (60) and the second degree arc (62) to include different or substantially different degrees of arc (66) depending on the direction of movement of the wiper (2) (also referred to as "directionally differentiated arc"). In other embodiments, the stop member (63) can be configured to allow the first degree arc (60) and preclude or substantially preclude the second degree arc (62). In embodiments of the wiper (2) having a pair of blades (17a)(17b) disposed a distance apart in substantially parallel relation, the leading one of the pair of blades (17a) can have a stop member (63) which allows travel of the sweep terminal (21) from the sweep resting position (58) through a first degree arc (60) opposite the direction of the wiper (2) on a wipeable surface (3), while the trailing one of the pair blades (17b) can have a stop member (63) which precludes or substantially precludes travel of the sweep terminal (21) from the resting position (21) through a second degree arc (62).

Figure 62:
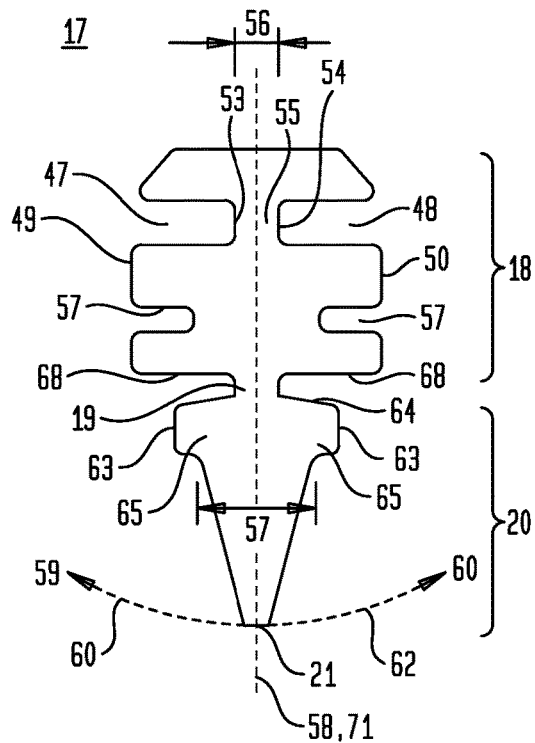
FIG. 62 is an end view of a particular embodiment of a wiper blade.
Figure 63:
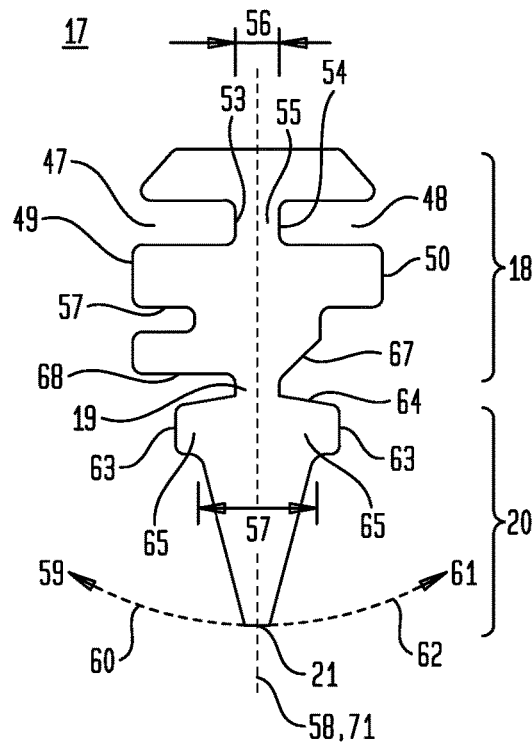
FIG. 63 is an end view of another particular embodiment of a wiper blade having a taper in the blade base.
Figure 64:
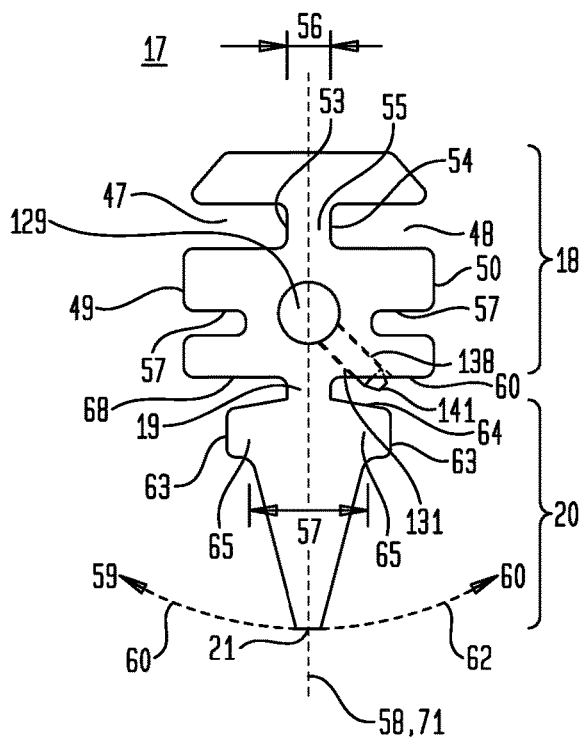
FIG. 64 is an end view of another particular embodiment of a wiper blade having a hollow passage disposed in the blade base and an outlet extending from the hollow passage open at an external surface of the blade base.

Now, with primary reference to FIGS. 62 and 64, in particular embodiments, the blade (17) can have bilateral symmetry with symmetrical halves on either side of the medial axial plane (71) of the blade (17). Now, with primary reference to FIGS. 63 and 65, in particular embodiments, the blade (17) can bilateral asymmetry on either side of the medial axial plane (71) of the blade (17) in which a sweep stop first side (69) or a base first side (49) (or both) and a sweep stop second side (70) or a base second side (50) (or both) afford asymmetrical halves on either side of the medial axial plane (71) of the blade (17). Again, with primary reference to FIGS. 63 and 65, as an illustrative example, the base first or second side (49)(50) can include a taper (67) extending between the base first side (49) or base second side (50) (or both) and the base face (68). The taper (67) allows the sweep terminal (21) to travel from the sweep resting position (58) toward the taper (67) in a first degree arc (60) delimited by engagement of the sweep (20) or the sweep stop (63) with the taper (67) or from the resting position (58) away from the taper (67) in a second degree arc (62) delimited by engagement of the sweep (20) or the sweep stop (63) with the base face (68). The taper (67) allows the first degree arc (60) to be greater than the second degree arc (62). In particular embodiments, the taper (67) can be variously configured to allow the first degree arc (60) to occur in a range of about 0 degrees to about 60 degrees. In particular embodiments, the second degree arc (62) can occur in a range of about 0 degrees to about 30 degrees; although the base first or second side (49)(50) can include a taper (67) configured to allow a greater or lesser first or second degree arc (60)(62) which can be directionally differentiated based on the application. In particular embodiments the first degree arc (134) can be selected from one or more of the group consisting of: about 1 degree to about 10 degrees, about 5 degrees to about 15 degrees, about 10 degrees to about 20 degrees, about 15 degrees to about 25 degrees, about 20 degrees to about 30 degrees, about 25 degrees to about 35 degrees, about 30 degrees to about 40 degrees, and about 45 degrees to about 55 degrees, and combinations thereof.

In particular embodiments, the second degree arc (62) can be selected from one or more of the group consisting of: about 1 degree to about 10 degrees, about 5 degrees to about 15 degrees, about 10 degrees to about 20 degrees, and about 15 degrees to about 25 degrees, and combinations thereof.

Now, with primary reference to FIGS. 66 through 69, in particular embodiments of the blade (17), a plurality of flexible members (19a)(19b) can extend from one base (18) in spaced apart relation from the base face (68), and the sweep (17) can comprise a corresponding plurality of sweeps (17a)(17b), correspondingly outwardly extending in spaced apart relation from the plurality of flexible members (19a)(19b) and terminating in a plurality of sweep terminals (21a)(21b). In particular embodiments, at least one sweep terminal (21a) of a plurality of sweeps (17a)(17b) can be capable of travel from the corresponding plurality of sweep resting positions (58a)(58b) toward the taper (67) in a first degree arc (60) or from the sweep resting position (117)

away from the taper (67) in a second degree arc (62), and each of the corresponding flexible members (19*a*)(19*b*) can act to return a corresponding one of the plurality of sweep terminals (19*a*)(19*b*) toward the corresponding plurality of sweep resting positions (58*a*)(58*b*).

Again, with primary reference to FIGS. 66 through 69, in particular embodiments a channel (72) can, but need not necessarily, be disposed in the base face (68) between the pair of flexible members (19*a*)(19*b*). The channel (72) can have a channel base (73) joining first and second of channel sides (74)(75) extending to said base face (68). The first or second channel side (74)(75) (or both) can correspondingly include a first taper (67*a*) or a second taper (67*b*) approaching the channel base (73). The pair of flexible members (19*a*)(19*b*) can flex to allow each of the pair of sweep terminals (21*a*)(21*b*) to travel from a resting position (58*a*)(58*b*) toward or away from the respective first or second taper (67*a*)(67*b*) of first or second channel sides (74)(75). A first one of the pair of sweeps (21*a*) can engage the first taper (67*a*) of said first channel side (74) to delimit travel of the first sweep (21*a*) in a first wiping direction (59) and a second one of the pair of sweeps (21*b*) can engage the second taper (67*b*) of the second channel side (75) to delimit travel of the second one of the pair of sweeps (21*b*) in a second wiping direction (61).

Figure 11:
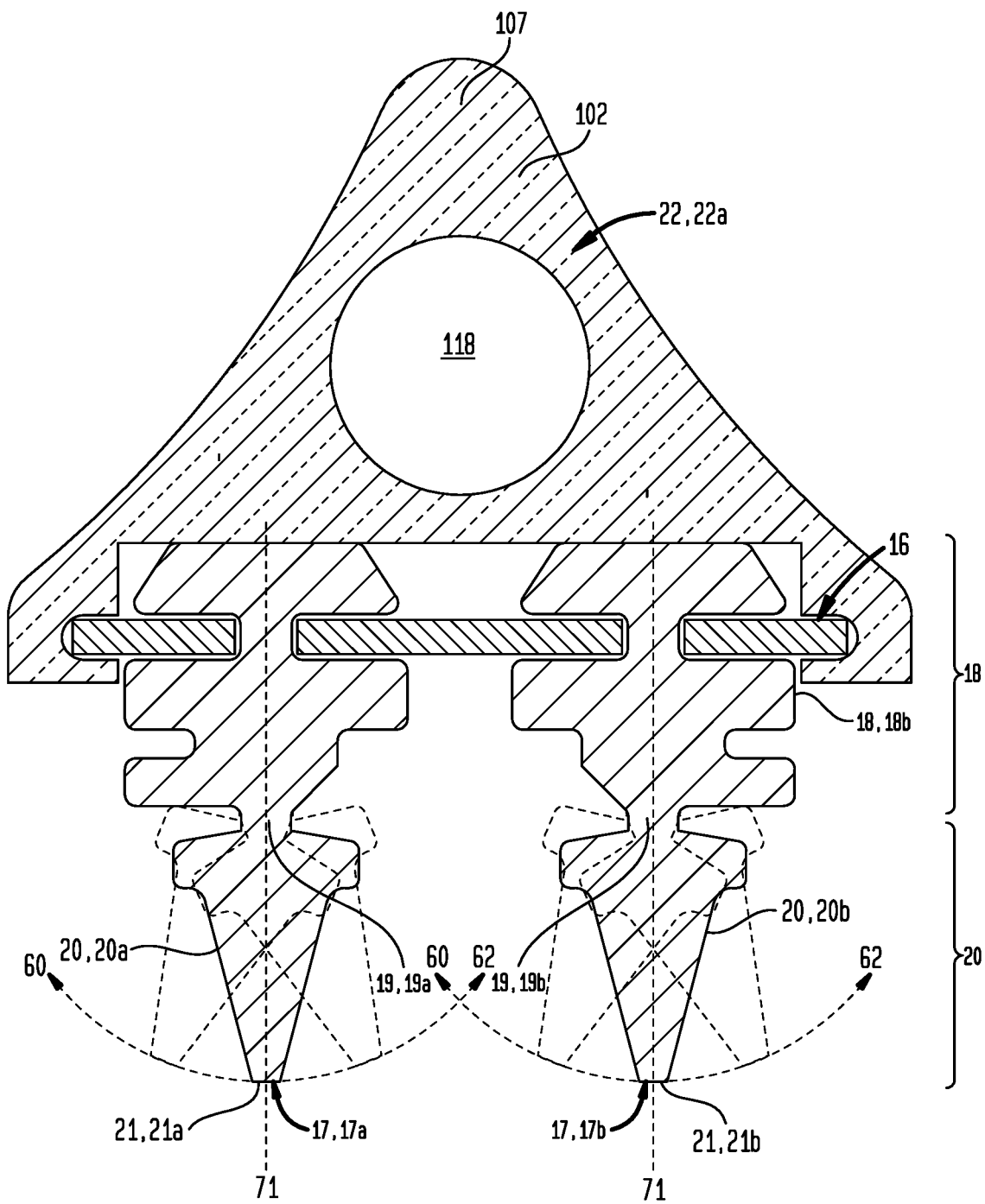
FIG. 11 is a cross section view 11-11 shown in FIG. 9.
Figure 12:
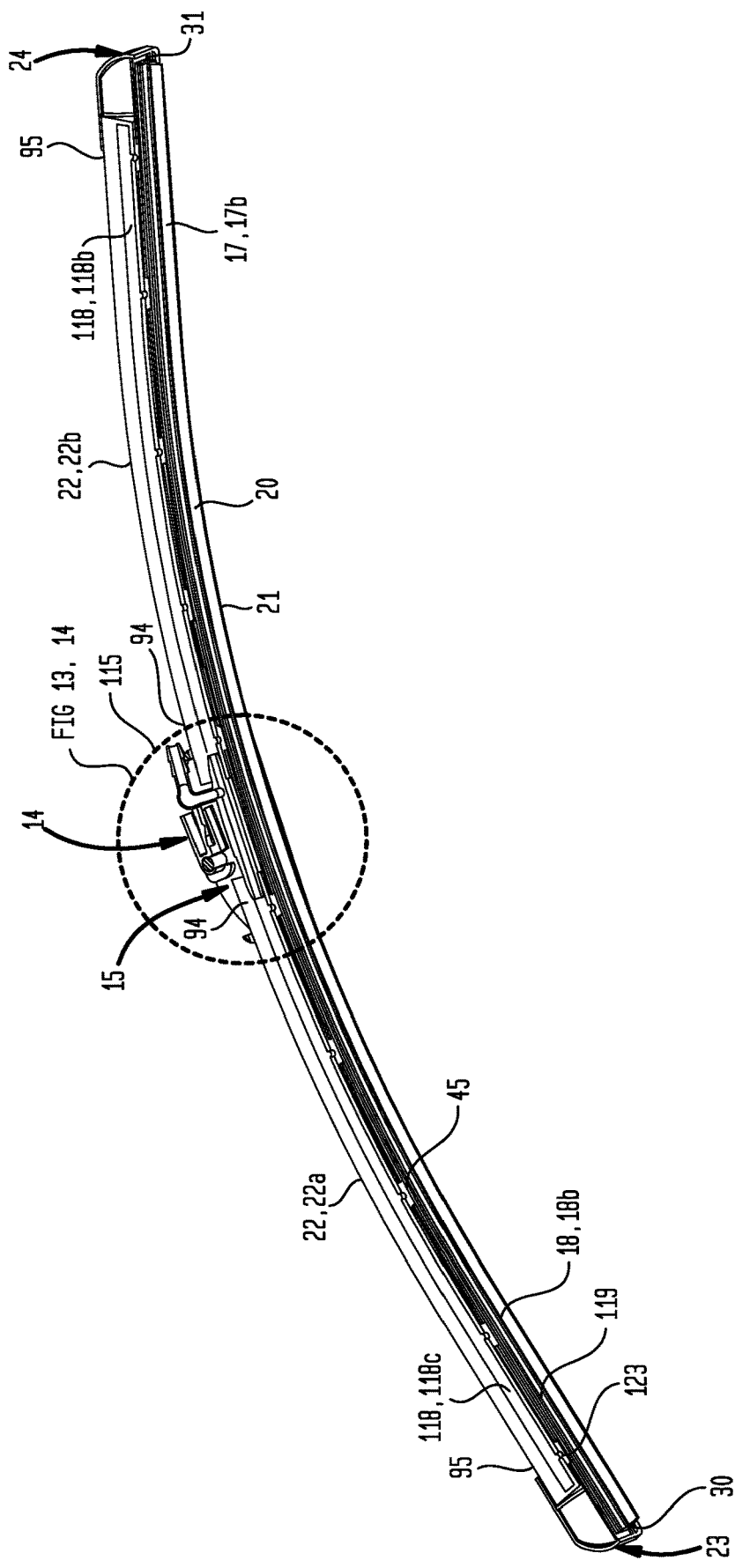
FIG. 12 is a cross section view 12-12 shown in FIG. 9.
Figure 13:
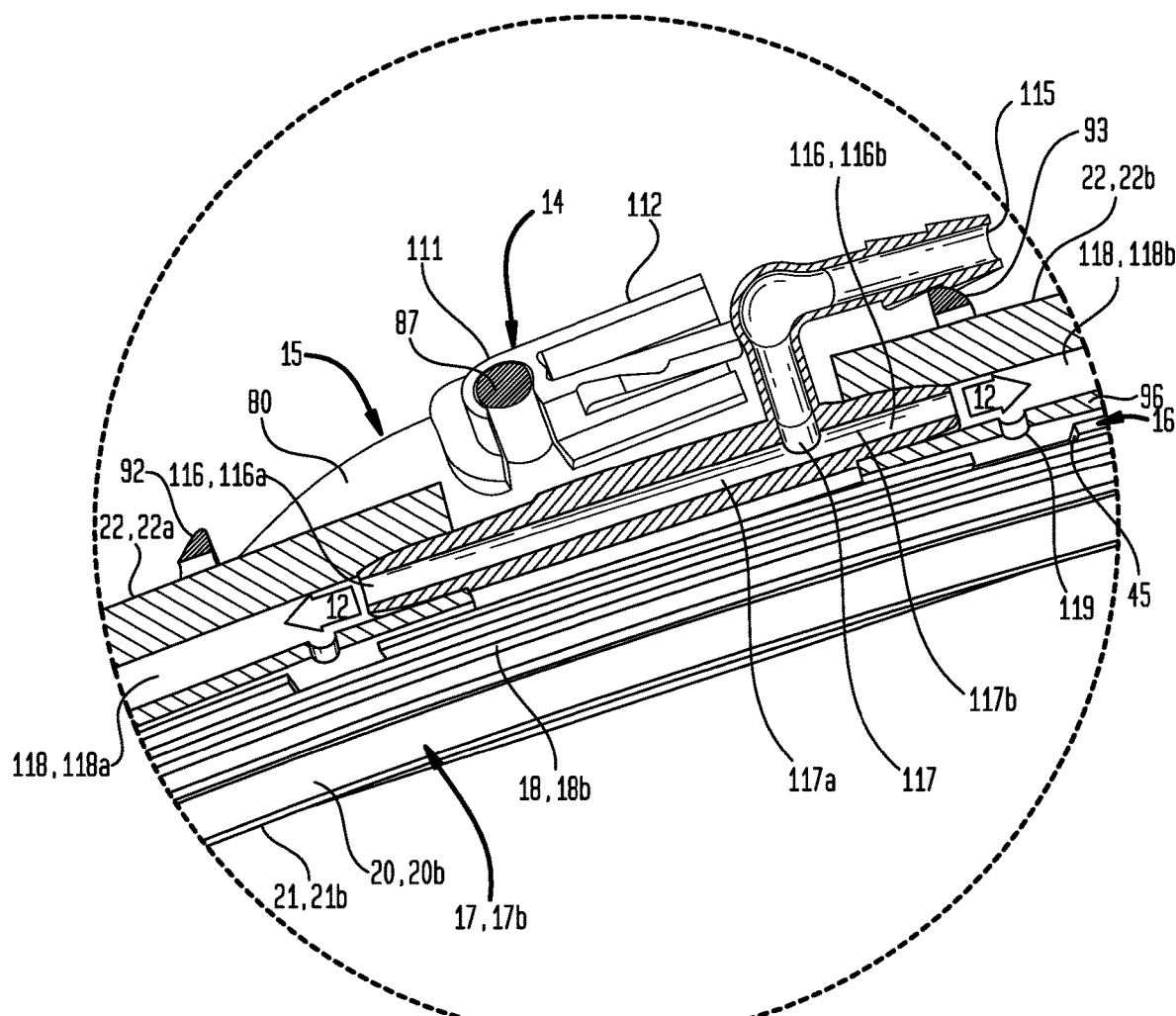
FIG. 13 is an enlarged cross section view 13-13 shown in FIG. 12 showing outlets disposed in the blade carrier cover.
Figure 14:
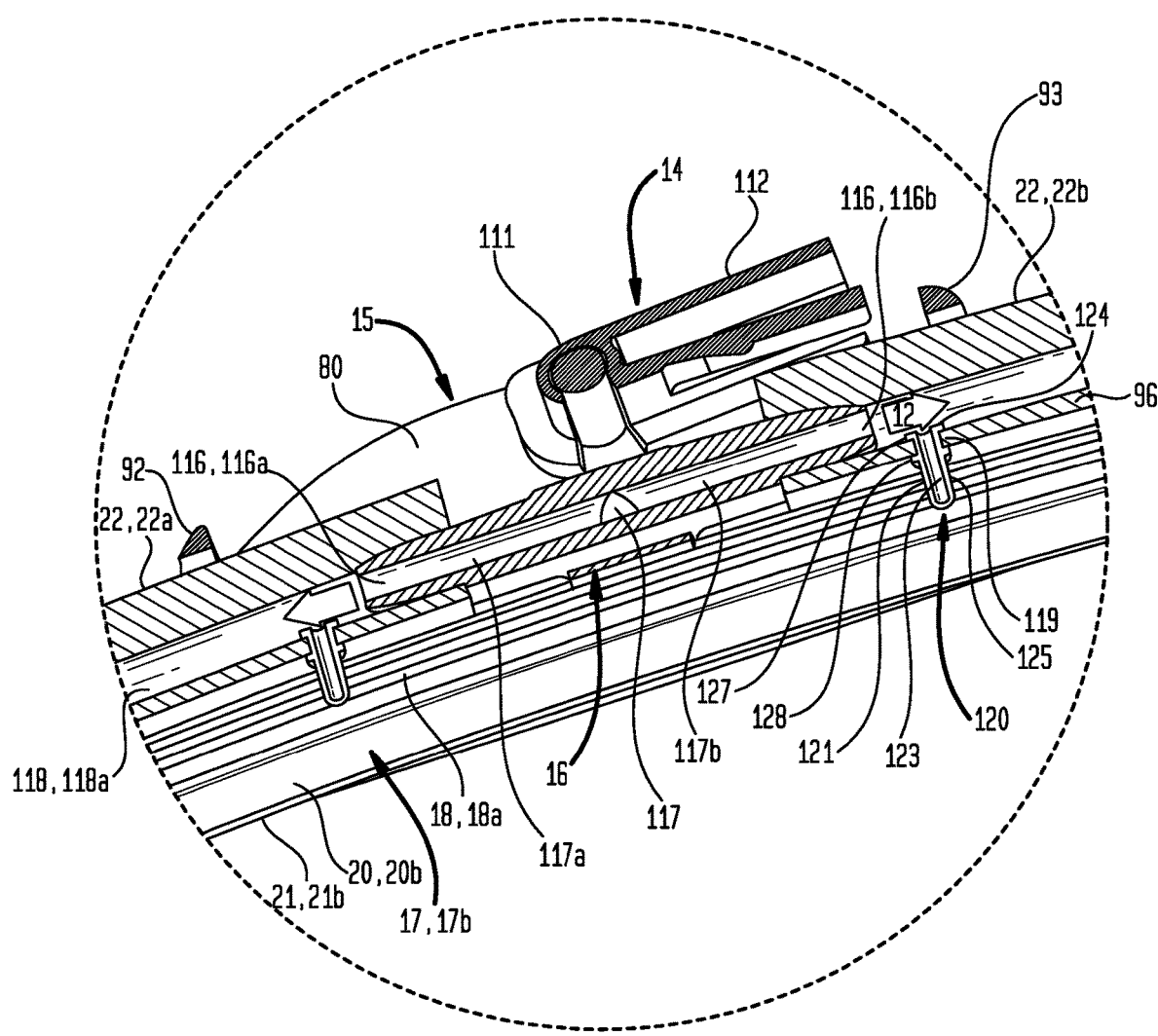
FIG. 14 is an enlarged cross section view 14-14 shown in FIG. 12 showing nozzles disposed in the outlets of the blade carrier cover.
Figure 18:
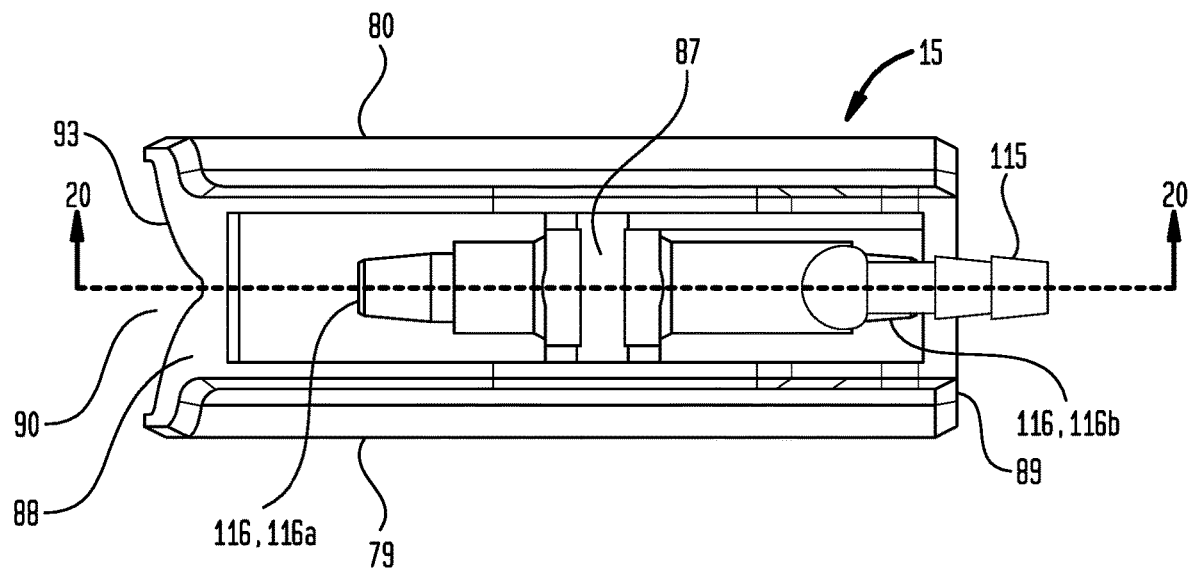
FIG. 18 is a top plan view of the wiper bracket shown in FIG. 15.
Figure 19:
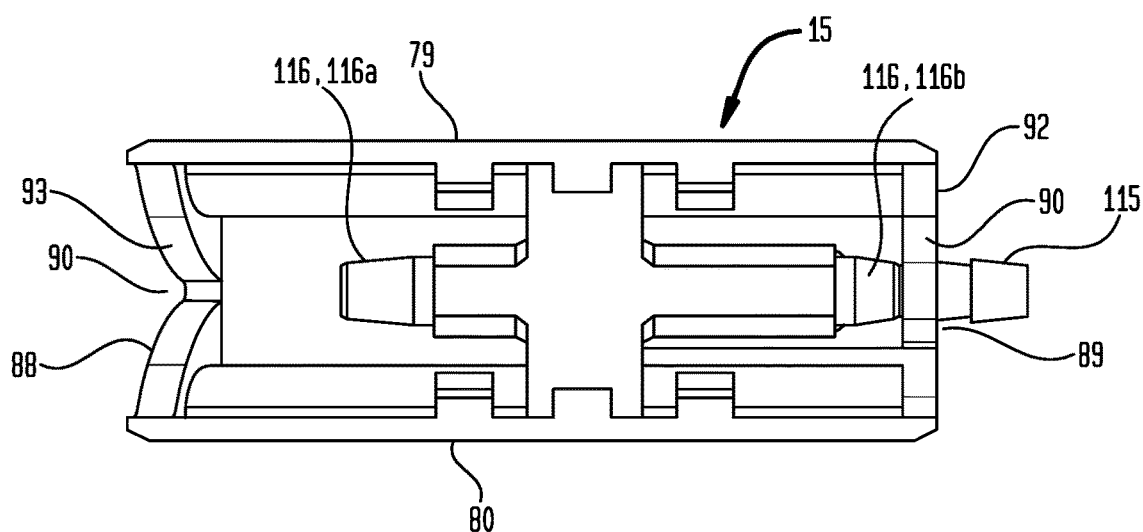
FIG. 19 is a bottom plan view of the wiper bracket shown in FIG. 15.
Figure 20:
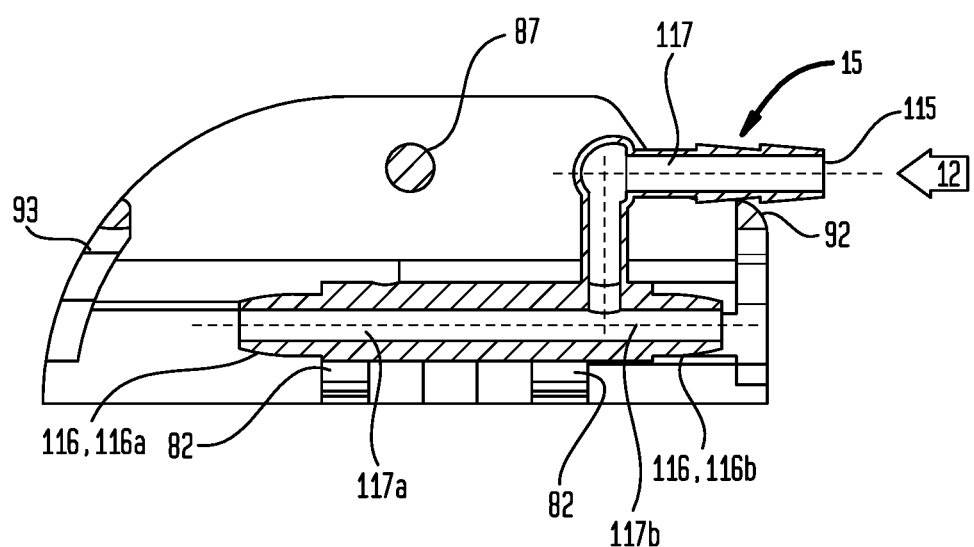
FIG. 20 is a cross section view 20-20 of the wiper bracket shown in FIG. 16.
Figure 21:
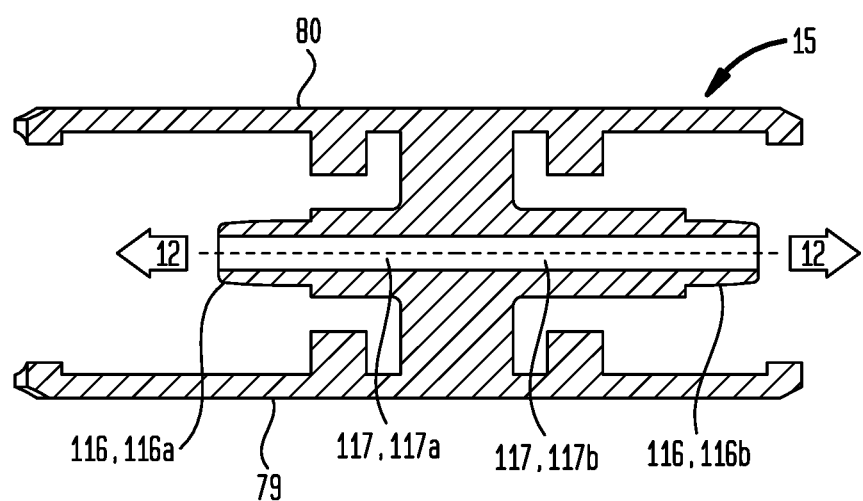
FIG. 21 is a cross section view 21-21 of the wiper bracket shown in FIG. 15.
Figure 22:
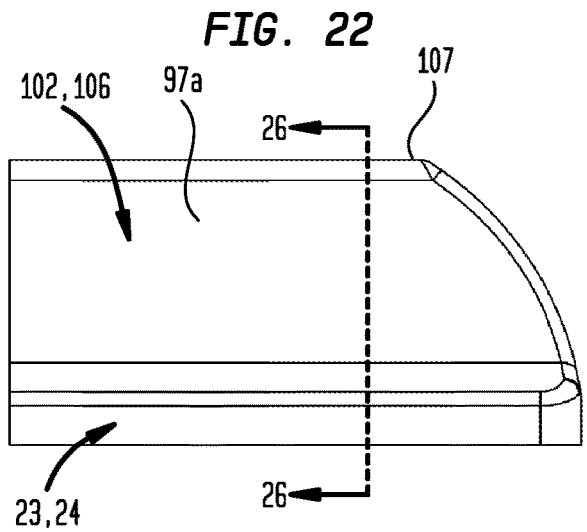
FIG. 22 is a first side elevation view of a particular embodiment of an end cap of the wiper shown in FIG. 4.
Figure 23:
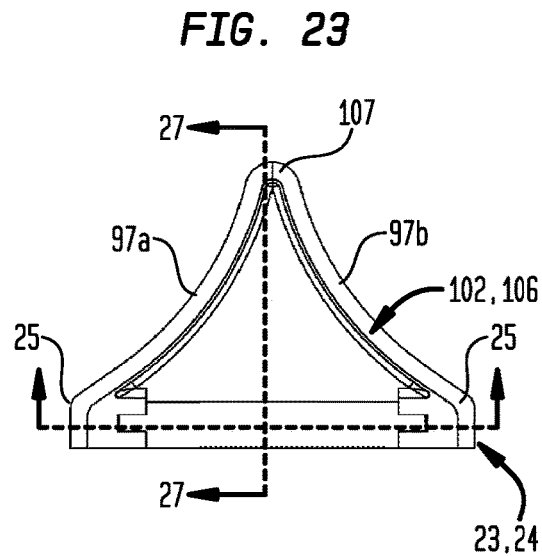
FIG. 23 is a first end view of the end cap shown in FIG. 22.
Figure 24:
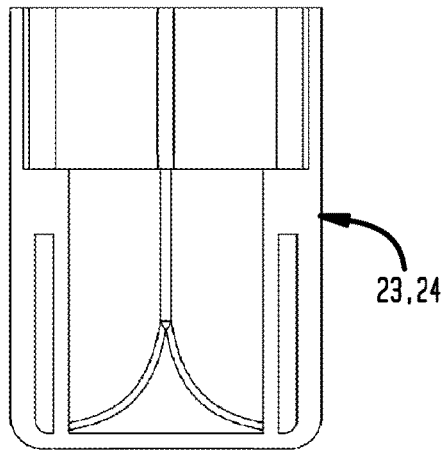
FIG. 24 is bottom plan view of the end cap shown in FIG. 22.
Figure 25:
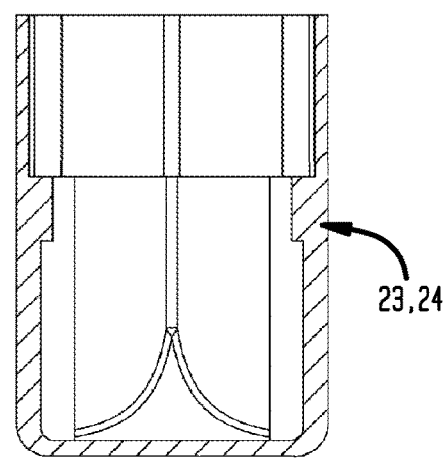
FIG. 25 is cross section view 25-25 of the end cap shown in FIG. 22.
Figure 26:
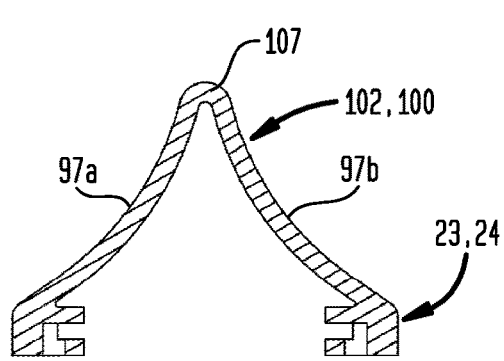
FIG. 26 is cross section view 26-26 of the end cap shown in FIG. 22.
Figure 27:
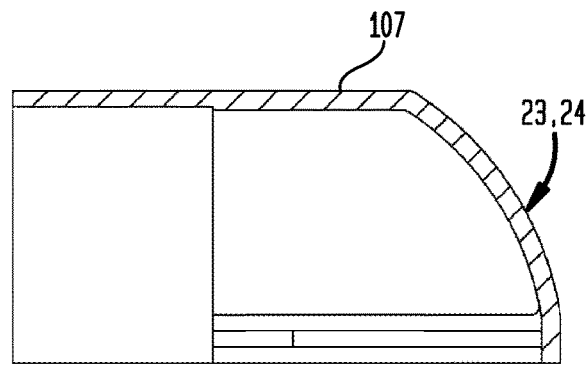
FIG. 27 is cross section view 27-27 of the end cap shown in FIG. 23.
Figure 28:
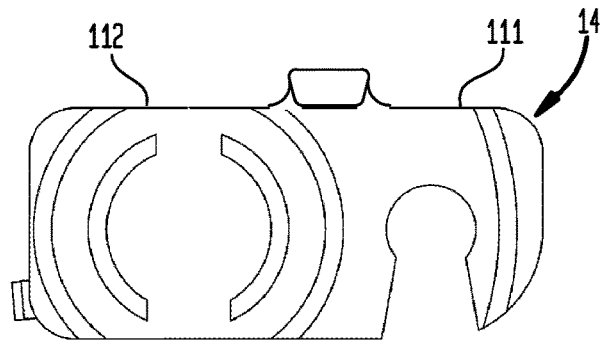
FIG. 28 is a first side elevation view of a particular embodiment of a wiper arm connector of the wiper shown in FIG. 4.
Figure 29:
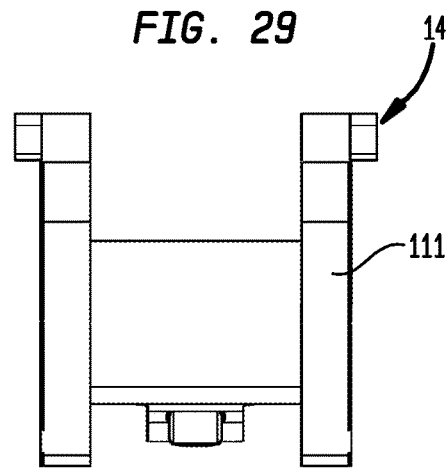
FIG. 29 is first end view of a particular embodiment of a wiper arm connector shown in FIG. 28.
Figure 30:
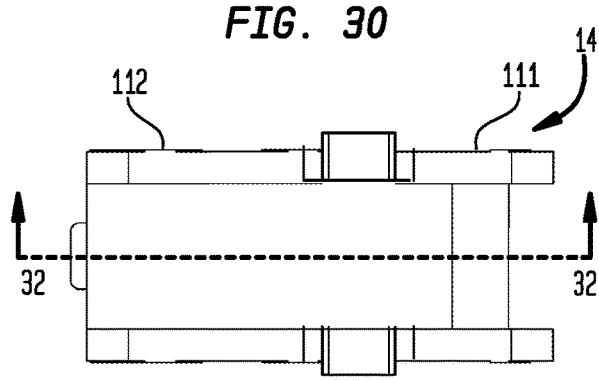
FIG. 30 is top plan view of the wiper arm connector shown in FIG. 28.
Figure 31:
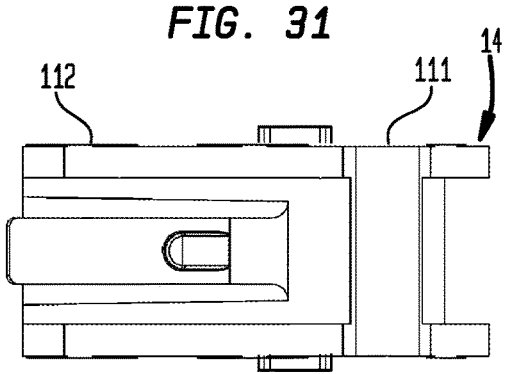
FIG. 31 is a bottom plan view of the wiper arm connector shown in FIG. 28.
Figure 32:
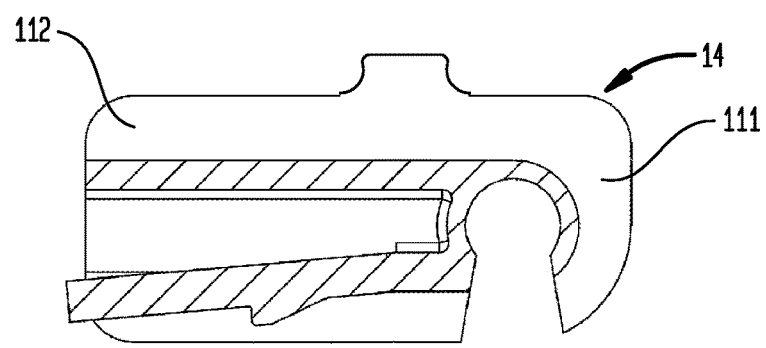
FIG. 32 is a cross section view 32-32 of the wiper arm connector shown in FIG. 30.
Figure 41:
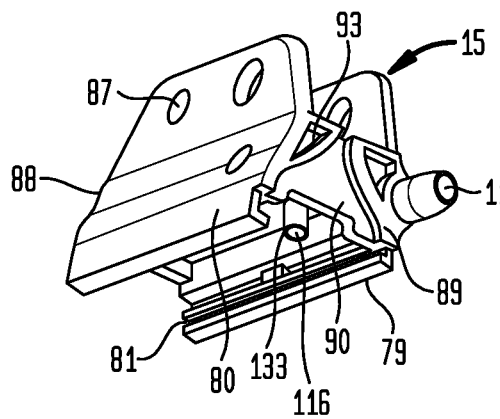
FIG. 41 is a perspective view of a particular embodiment of a wiper bracket of the wiper shown in FIG. 34.
Figure 42:
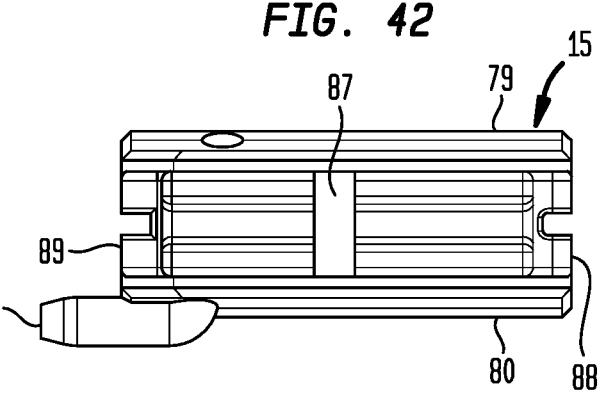
FIG. 42 is a top plan view of the wiper bracket shown in FIG. 41.
Figure 43:
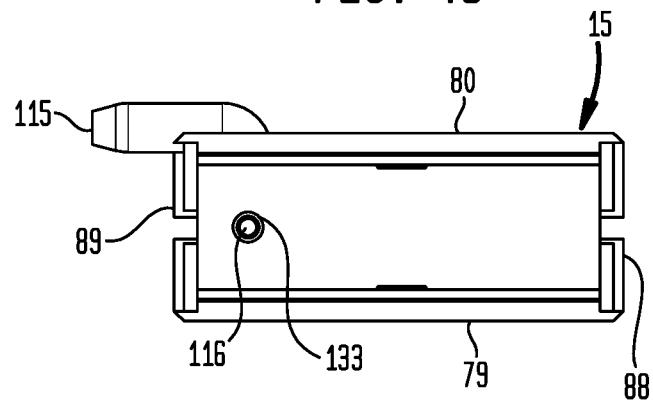
FIG. 43 is bottom plan view of the wiper bracket shown in FIG. 41.
Figure 44:
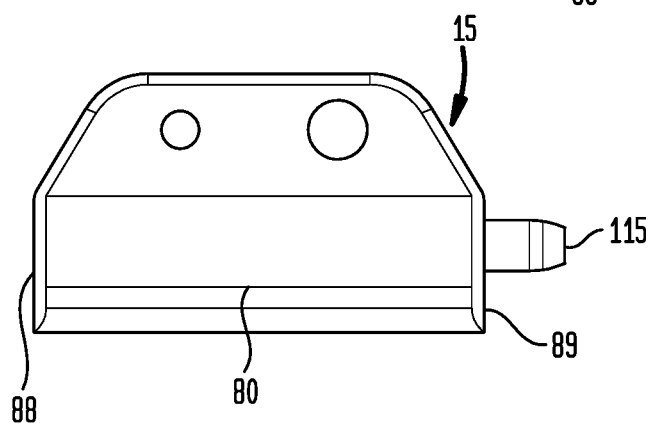
FIG. 44 is first side elevation view of the wiper bracket shown in FIG. 41.
Figure 45:
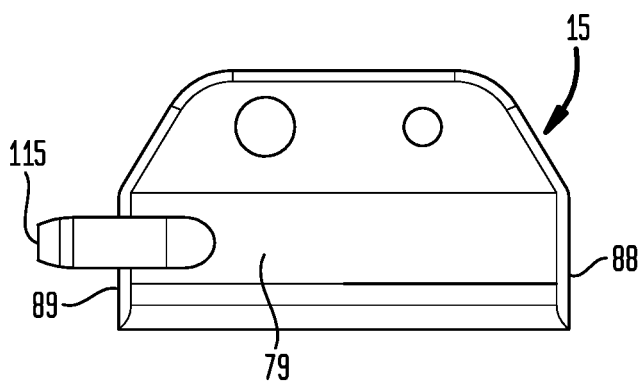
FIG. 45 is second side elevation view of the wiper bracket shown in FIG. 41.
Figure 46:
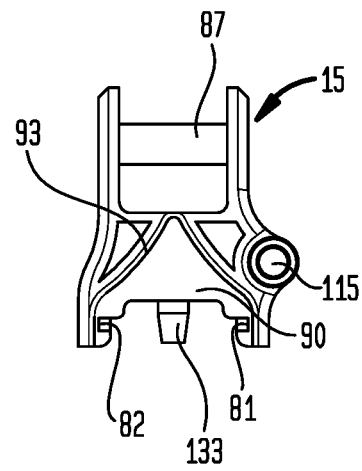
FIG. 46 is first end view of the wiper bracket shown in FIG. 41.
Figure 47:
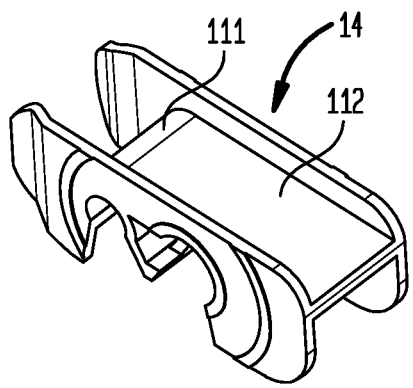
FIG. 47 is a perspective view of a particular embodiment of a wiper arm connector of the wiper shown in FIG. 34.
Figure 48:
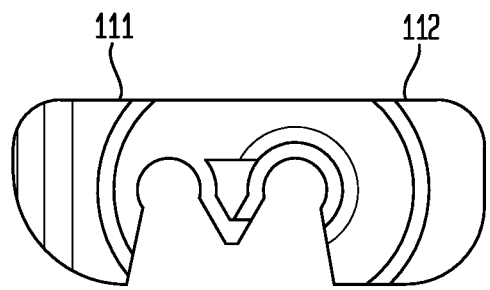
FIG. 48 is first side view of the wiper arm connector shown in FIG. 47.
Figure 49:
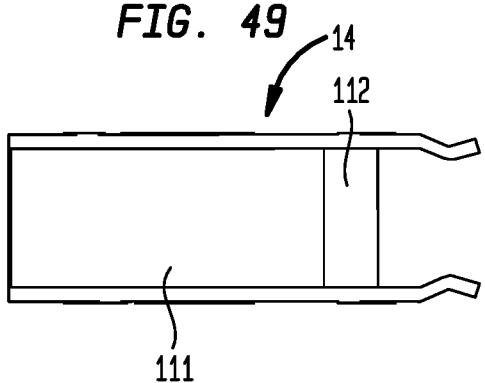
FIG. 49 is top plan view of the wiper arm connector shown in FIG. 47.
Figure 50:
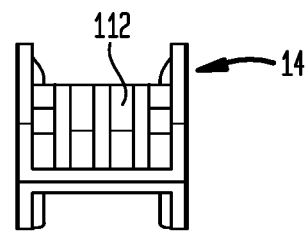
FIG. 50 is a bottom plan view of the wiper arm connector shown in FIG. 47.
Figure 51:
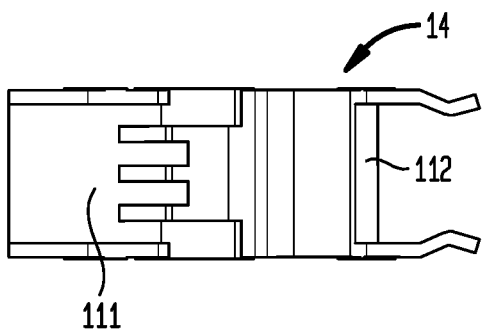
FIG. 51 is a first end view of the wiper arm connector shown in FIG. 47.
Figure 52:
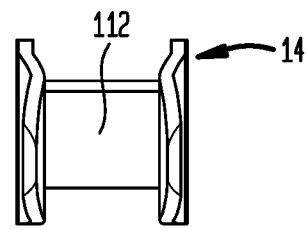
FIG. 52 is a second end view of the wiper arm connector shown in FIG. 47.
Figure 53:
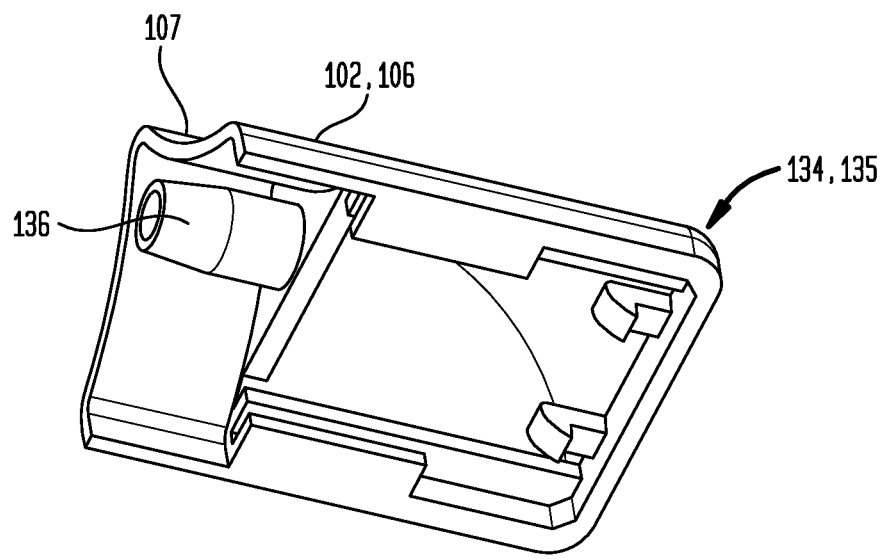
FIG. 53 is a bottom perspective view of a particular embodiment of the end cap of the wiper shown in FIG. 34.
Figure 54:
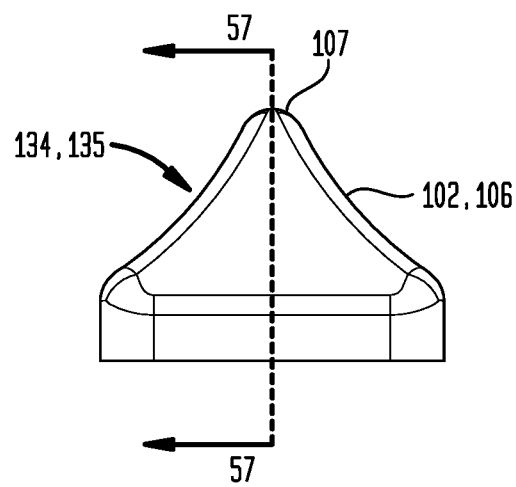
FIG. 54 is a first end view of the end cap shown in FIG. 53.
Figure 55:
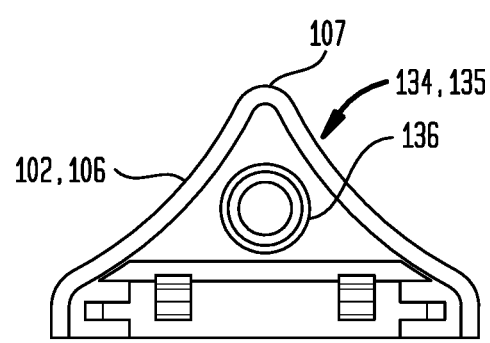
FIG. 55 is a second end view of the end cap shown in FIG. 53.
Figure 56:
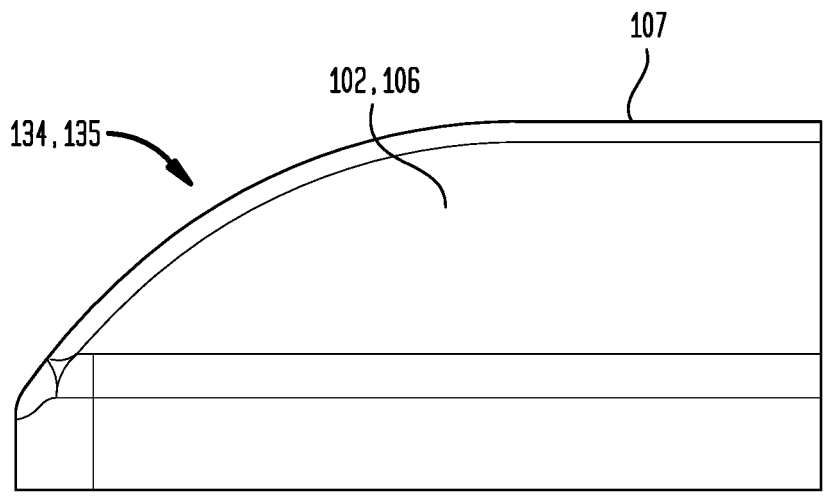
FIG. 56 is an elevation view of the end cap shown in FIG. 53.
Figure 57:
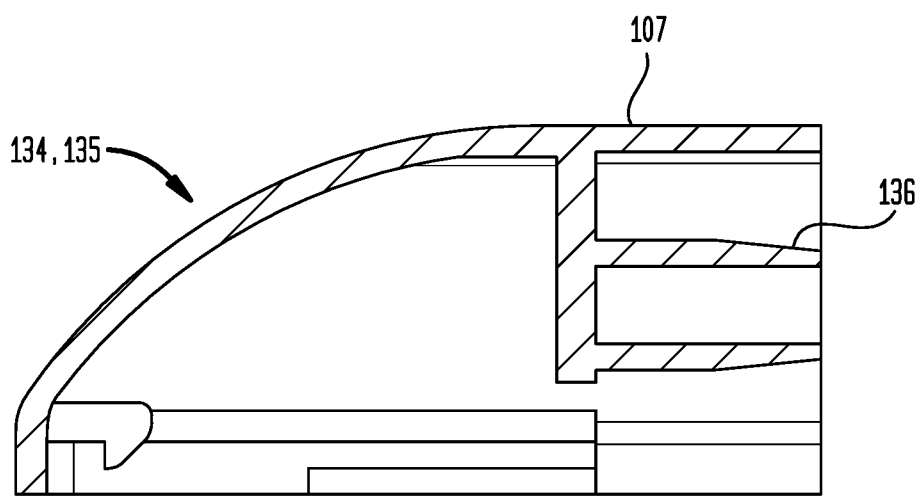
FIG. 57 is a cross section view 57-57 of the end cap shown in FIG. 54.
Figure 58:
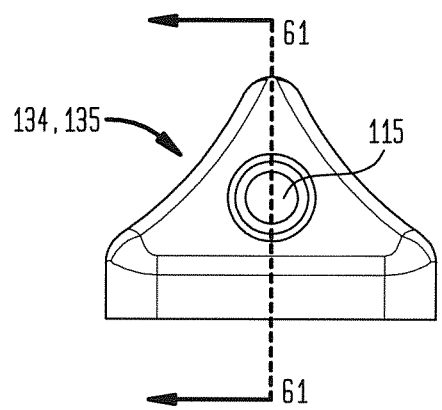
FIG. 58 is first end view of another particular embodiment of the end cap of the wiper shown in FIG. 34.
Figure 59:
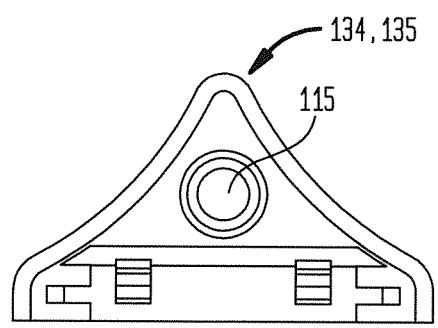
FIG. 59 is second end view of the end cap shown in FIG. 58.
Figure 60:
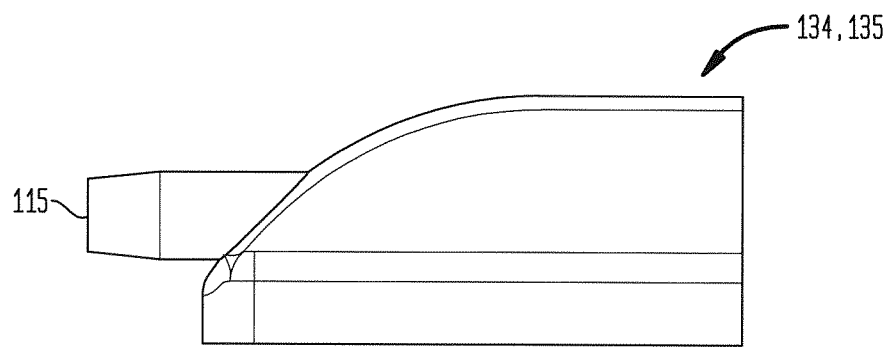
FIG. 60 is side elevation view of the end cap shown in FIG. 58.

Now referring primarily to FIGS. 11 and 69, a method of using embodiments of the wiper (2) having a plurality of blade (17*a*)(71*b*) includes a directional movement of a first sweep (20*a*) and a second sweep (20*b*) engaged to a wipeable material (6) in a first wiping direction (59) which generates a first wiping force (76) on the first and second sweeps (17*a*)(17*b*). The first wiping force (76) causes the corresponding plurality of flexible members (19*a*)(19*b*) to flex allowing the first and second sweep terminals (21*a*)(21*b*) to travel through first degree arcs (60). In the illustrative example of FIG. 69, the first wiping force (76) of the first wiping direction (59) causes the first sweep (17*a*) to travel through the first degree arc (60) which terminates when the first sweep (17*a*) or the first sweep stop (58*a*) contacts the first taper (67*a*) disposed on the first channel side (74) of the channel (72) in the blade base (18). Concurrently, the first wiping force (76) in the first wiping direction (59) causes the second sweep (17*b*) to travel through a first degree arc (60) which terminates when the second sweep (17*b*) or the second sweep stop (63*b*) contacts the base face (68). The first degree arc (60*a*) of the first sweep (17*a*) being greater than the first degree arc (60*b*) of the second sweep (17*b*), whereby the angle of the first sweep (17*a*) in relation to the sweep resting position (58*a*) during the first wiping direction (59) can be greater than the angle of the second sweep (17*b*) in relation to the sweep resting position (58*b*) during the first wiping direction (59).

Similarly, again with primary reference to FIG. 69, an opposite second wiping direction (61) generates an opposite second wiping force (77). The second wiping direction (61) causes the first sweep (17*a*) to travel through a second degree arc (62) which terminates when the first sweep (17*a*) or sweep stop (58*a*) contacts the base face (68). Concurrently, the second wiping direction (61) causes the second sweep (17*b*) to travel through a second degree arch (62) which terminates when the second sweep (17*b*) sweep stop (58*b*) contacts the contacts the second taper (67*b*) disposed on the second channel side (75) of the channel (72). The second degree arc (62) of the second sweep (17*b*) being greater than the second degree arc (62) of the first sweep (17*a*), whereby the angle of the second sweep (17*b*) in relation to the sweep resting position (58*b*) during the second wiping direction (61) can be greater than the angle of the first sweep (17*a*) in relation to the sweep resting position (58*a*) during the second wiping direction (61). As to each of the first sweep (17*a*) and the second sweep (17*b*) the travel of the corresponding sweep terminal (21*a*)(21*b*) in the first and second degree arcs (60)(62) is directionally differentiated in that first degree arc (60) is different than the second degree arc (62).

Figure 3:
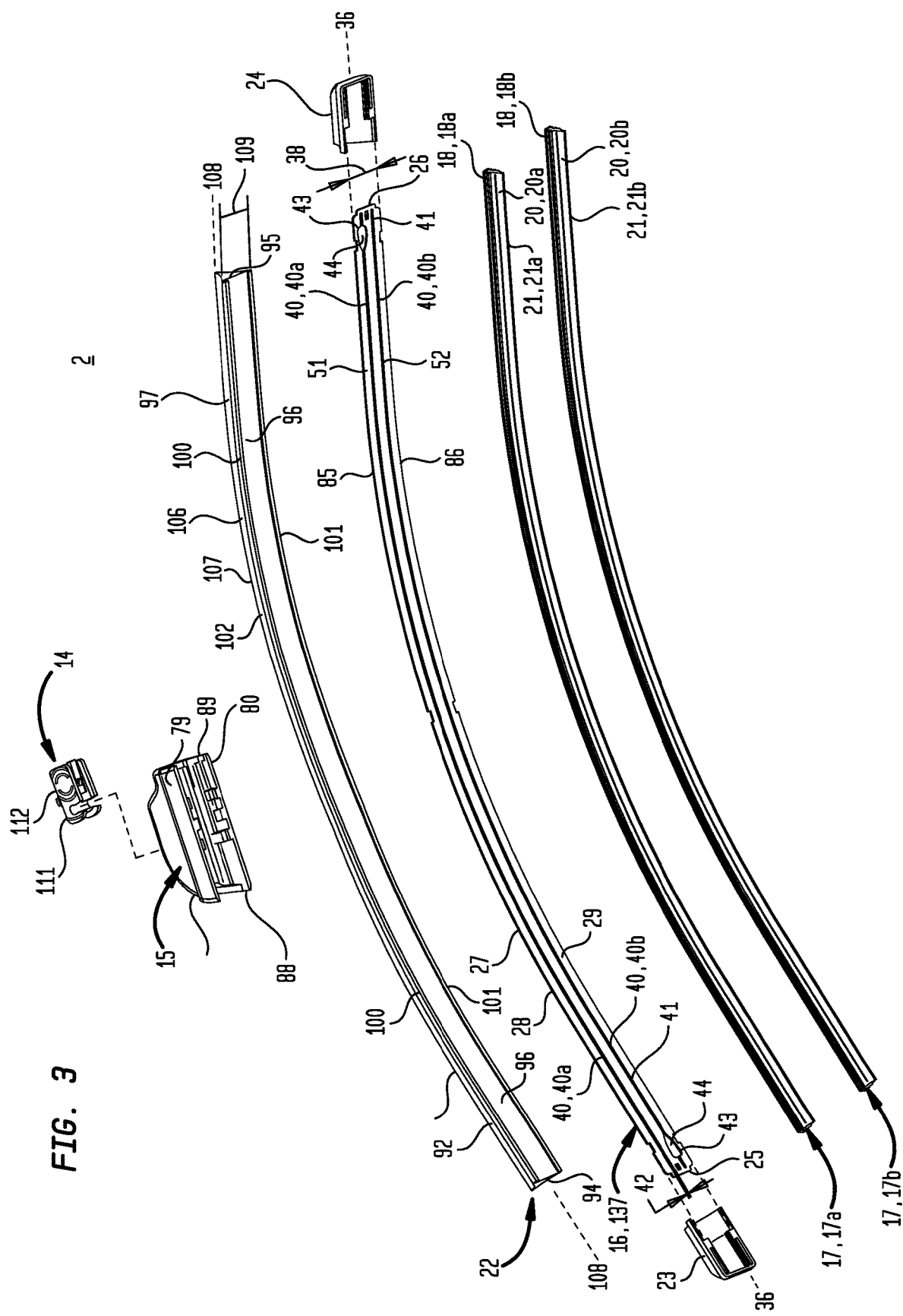
FIG. 3 is an exploded view of a particular embodiment of the wiper and method of assembly.
Figure 4:
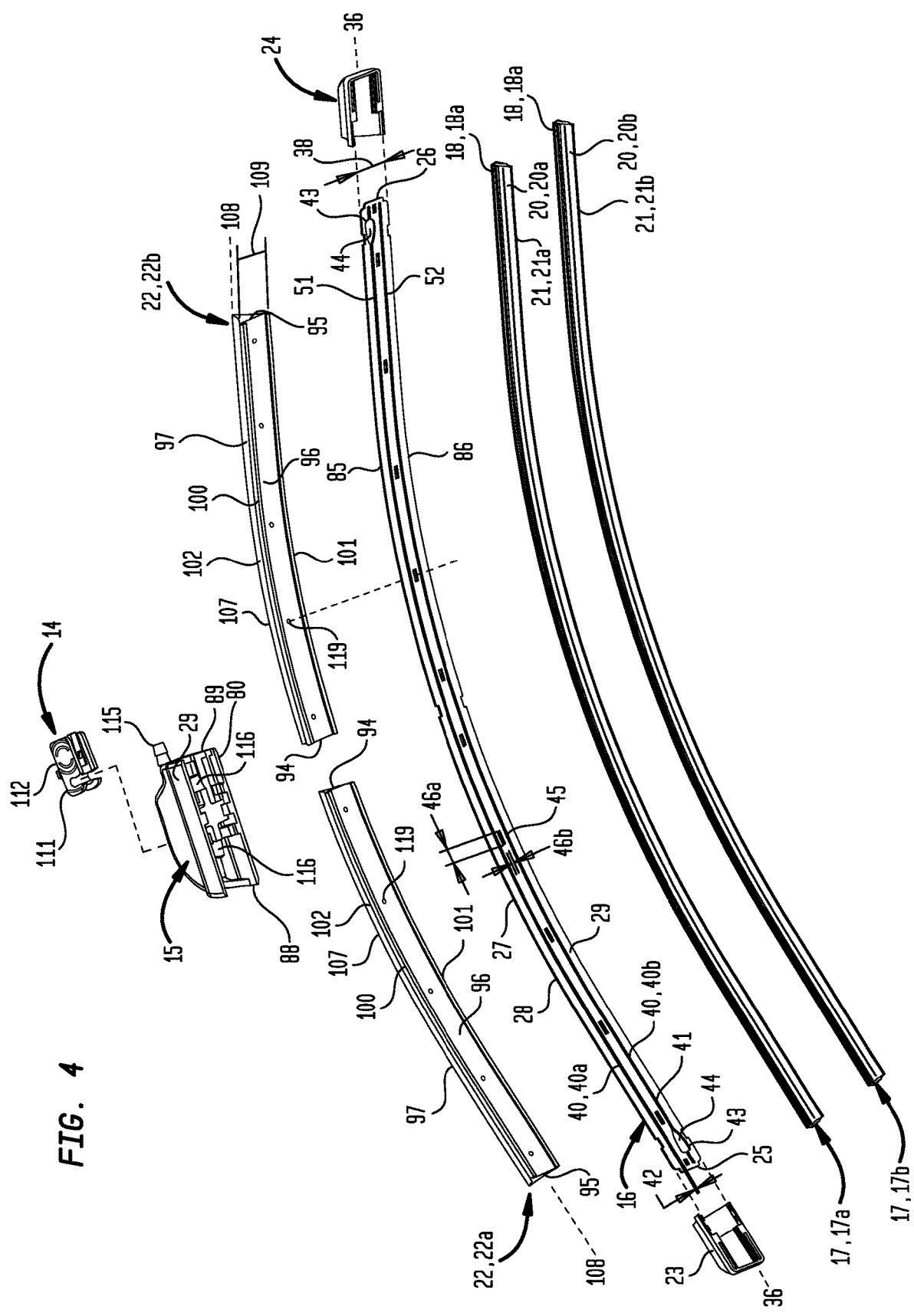
FIG. 4 is an exploded view of another particular embodiment of the wiper and method of assembly.
Figure 5:
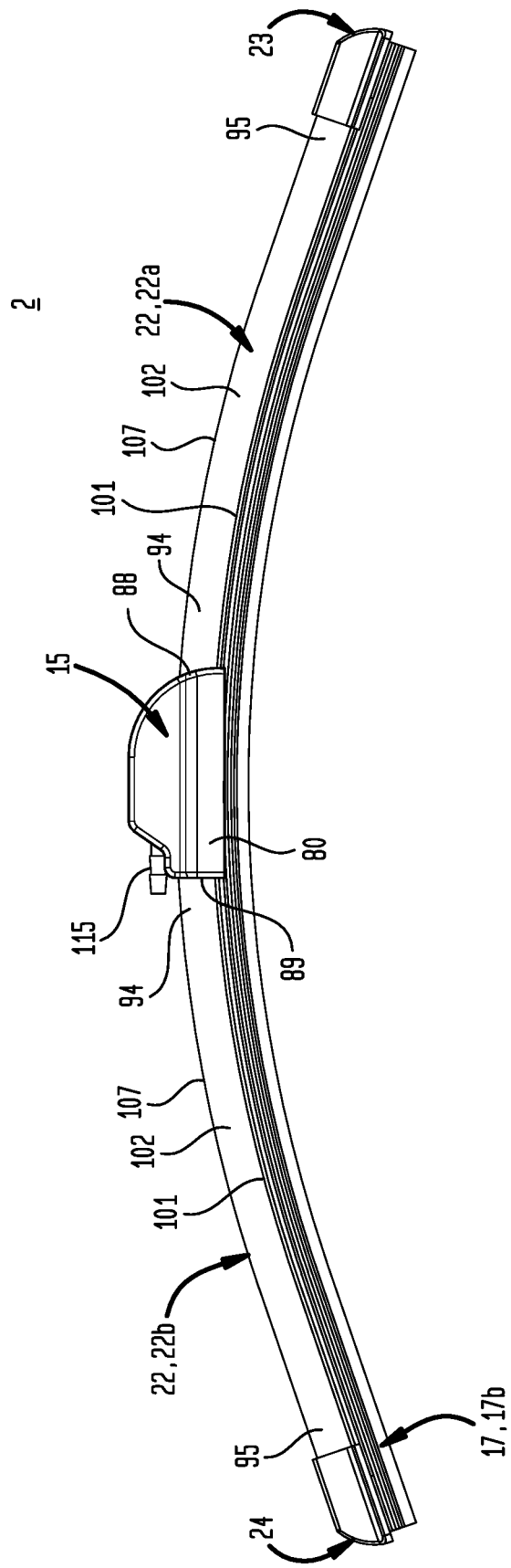
FIG. 5 is an elevation view of the particular embodiment of the wiper shown in FIG. 4.
Figure 10:
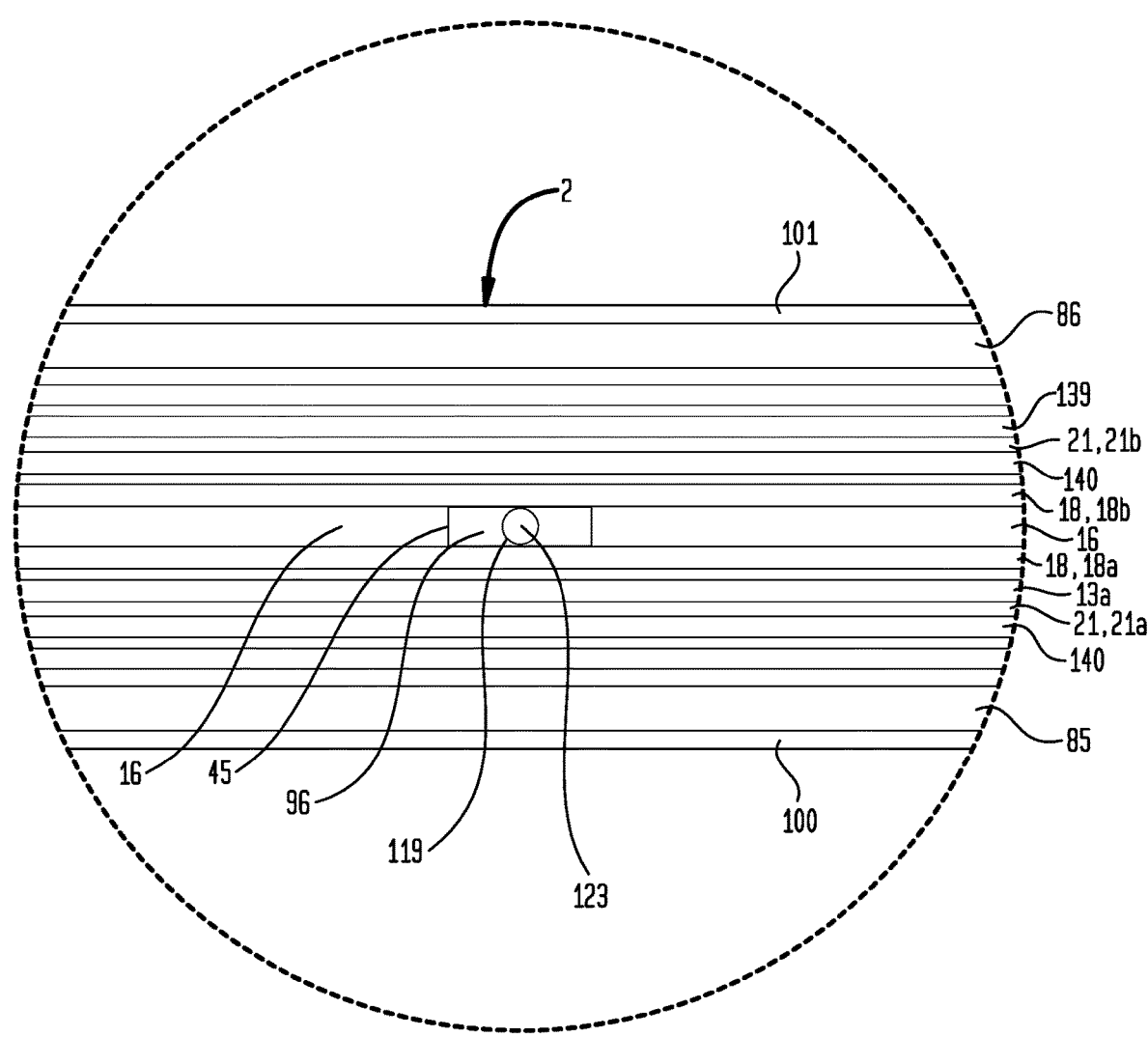
FIG. 10 is an enlargement of a portion of the bottom plan view of the wiper shown in FIG. 9.

Again, with general reference to FIGS. 1 through 69 and with primary reference to FIGS. 62 through 69, embodiments configured to exhibit directionally differentiated first and second degree arcs (60)(62), whether by configuration of one or more of the base (18), the sweep (20), or sweep stop (63), and whether in embodiments including one sweep (18) embodiment (as shown in the illustrative examples of FIGS. 62 through 65), or a two sweep (20) embodiment whether including individual first and second blades (as shown in the illustrative examples of FIGS. 3 and 4) or including a pair of sweeps (20) joined to a one base (as shown in the illustrative examples of FIGS. 33 and 66 through 69) or embodiments including a plurality of sweeps (20) greater than two sweeps, can confer substantial advantages in function of the sweep (20) in particular, or the function of in the wiper (2) in general, and regardless of the embodiment can substantially improve engagement of the sweep(s) (20) with the wipeable materials (6). In the illustrative examples including more than one sweep (20) (as shown in FIGS. 3, 4 and 33), the corresponding structure without directionally differentiated arcs between the plurality of sweeps (20) can result in periodic lifting (conventionally referred to as "chatter") of the leading sweep (20*a*) in relation to the wipeable material (6), and more prominently in the trailing sweep (20*b*) in the plurality of sweeps (20) in relation to the wipeable material (6). Conversely, the structure of the wiper blade(s) (15) including directionally differentiated arcs of each sweep (20) and between sweeps (20*a*)(20*b*) can afford less lifting of the leading sweep (20*a*) of plurality of sweeps in relation to the wipeable material (6) and can substantially reduce or eliminate lifting of the trailing sweep (20*b*) of a plurality of sweeps. In particular embodiments, depending on the application, embodiments which lack a bilateral asymmetrical structural configuration (such as the taper (67) in a first or second base side (49)(50) allowing for directionally differentiated first and second arcs (60)(62) of a sweep (20) in each blade (17) or in a first or second degree arc (60)(62) between a plurality of sweeps (17*a*)(17*b*) in a first or second wipeable direction (59) or (61) may make the structure of the wiper blade (15), the wiper (2) or the wiper system (1) unsuitable for use due to the excessive lifting of one or a plurality of sweeps (20) in one or both of the first or second wiping directions (59)(60).

One-piece. Now with primary reference to FIGS. 62 through 69, in particular embodiments, one or more of: the base (18), the flexible member(s) (19), the sweep(s) (20), and the sweep stop (63) can comprise one-piece; however, this is not intended to preclude embodiments assembled from component parts.

Again, with primary reference to FIGS. 62 through 69, embodiments of the blade (17) can be produced from a variety of conventional elastomers to provide a sufficient amount of flexure, and as examples: natural rubber, chloroprene rubber, synthetic rubber, dimethyl silicone raw rubber, methyl vinyl silicone raw rubber, methyl phenyl vinyl silicone raw rubber, fluorosilicone raw rubber, or combinations thereof. In particular embodiments, the hardness of the elastomer(s) can be adjusted depending on the application, and in particular after curing, the hardness of the base (18)

or the sweep (20) can, but need not necessarily, occur in the range of about 50A durometer to about 95A durometer. As to certain embodiments of the invention, the sweep (20) may function primarily to sweep or move wipeable materials (6) from a wipeable surface (3), while in other embodiments the sweep (20) may be sufficiently hard to cut or scrape wipeable materials (6) from the wipeable surface (2). While the sweeping property of the blade (17) may deteriorate when the rubber hardness is lower than 50A durometer as well as higher than 95A durometer (embodiments can occur incrementally in the durometer range).

Figure 61:
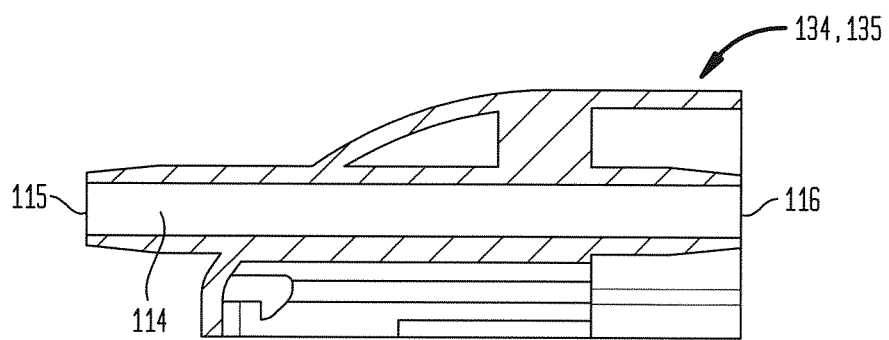
FIG. 61 is a cross section view 61-61 of the end cap shown in FIG. 58.

The Wiper Bracket. Now, with general reference to FIGS. 1 through 61, embodiments of the wiper bracket (15) can be configured to couple to the blade carrier (16) (whether extending outward of a blade carrier first side (which may be a convex side) (28) or extending outward of a blade carrier second side (which may be a concave side) (29) to allow embodiments of the wiper (2) to engage a numerous and wide variety of wipeable surfaces (3). In particular embodiments, the wiper bracket (15) can, but need not necessarily, include a bracket base (78) having a pair of bracket members (79)(80) disposed a distance apart in opposite facing relation. A pair of blade carrier receiving grooves (81)(82) can be correspondingly disposed in the pair of inwardly facing bracket member walls (83)(84). In particular embodiments, the opposite blade carrier peripheral margins (85)(86) of the blade carrier (16) can be correspondingly slidably engaged in the pair of blade carrier receiving grooves (81)(82) to slidably dispose the wiper bracket (15) medially on the blade carrier (16). In other particular embodiments, the bracket member walls (83)(84) can be sufficiently resiliently flexible to allow the wiper bracket (15) to flex and correspondingly receive the peripheral margins (85)(86) of the blade carrier (16) in the pair of blade carrier receiving grooves (81)(82). In particular embodiments, a bracket pivot (87) can interconnect the pair of bracket members (79)(80) and a wiper arm connector (14) can be pivotally coupled to the bracket pivot (87). In particular embodiments, the wiper bracket (15) can be open at the bracket first or second end (88)(89). The bracket first or second end (88)(89) can correspondingly include bracket first and second end openings (90)(91) each defined by bracket first and second end opening peripheries (92)(93) which can be variously configured to be disposed over or receive a variously configured blade carrier covers (22).

The Blade Carrier Cover. Now, with general reference to FIGS. 1 through 61, embodiments can further include a blade carrier cover (22) having a length disposed between blade carrier cover first and second ends (94)(95) which can be disposed over the blade carrier (16) (whether substantially flat or arcuately convex or concave) between opposed blade carrier ends (25)(26). In particular embodiments, the blade carrier cover (22) can, but need not necessarily, include a one piece blade carrier cover (22) (as shown in the illustrative example of FIG. 3), and in particular embodiments, the blade carrier cover (22) can include a pair of blade carrier covers (22a)(22b)(as shown in the illustrative examples of FIGS. 4 and 33) each having a blade carrier cover length disposed between a blade carrier cover first end (94) correspondingly received in the bracket first and second end openings (90)(91) and blade carrier cover second end (95) disposed proximate a corresponding blade carrier first or second end (23)(24). Embodiments of the blade carrier cover (22) can include a generally flat cover interior surface (96) and a cover exterior surface (97) (which can have numerous and varied configurations depending on the application) extending to opposed blade carrier cover axial peripheral margins (98)(99) configured to secure the blade carrier cover (22) to corresponding blade carrier axial peripheral margins (85)(86). In particular embodiments, the axial peripheral margins (85)(86) of the blade carrier cover (22) can include inwardly extending return members (100)(101) which can engage the corresponding peripheral margins (61a)(61b) of the blade carrier (13), whether by flexure of the blade carrier cover (16) to allow snap fit engagement of the return members (79a)(79b) to the corresponding peripheral margins (98)(99) of the blade carrier (16) or by sliding the blade carrier (16) between the blade carrier cover (15) and the return members (100)(101); however, these illustrative examples are not intended to preclude other structures to secure the blade carrier cover (22) to the blade carrier (16), including as illustrative examples, interference fit features, snap fit features, mechanical fasteners, such as screws or clips, or similar fasteners.

The Blade Carrier Cover Airfoil. Now, with general reference to FIGS. 1 to 61, embodiments of the blade carrier cover (22) can, but need not necessarily, further include an airfoil (102). The term "airfoil" for the purposes of this invention means a blade carrier cover (22) which when in motion relative to the surrounding air (103) either increases or applies downward force (104) onto the wiper (2) (as shown in the illustrative example of FIG. 1) or reduces likelihood of or resists wind lift (105) of the wiper (2). Now, with primarily reference to FIGS. 5 through 7 and 34 through 36, particular embodiments of the airfoil (102) include an airfoil external surface (106) which extends outward from the opposed axial peripheral margins (98)(99)) of the blade carrier (16) and tapers inwardly, whether linearly or arcuately, to an airfoil terminal edge (107). Again, with primary reference to FIG. 2, while the contour of airfoil external surface (106) can take a numerous and wide variety of structural configurations which in motion to the surrounding air (103) apply a downward force (104) to the wiper (2), such as, an elliptical configuration wide in the in-plane direction and thin in the out-of-plane direction with the terminal edge (107) offset from the medial longitudinal axis (108) of the blade carrier cover (22), or affording a generally continuous arcuate circular airfoil external surface (106) between each peripheral margin (98)(99) of the blade carrier (16) and an airfoil terminal edge (107) generally disposed along the medial longitudinal axis (108) of the blade carrier cover (16). In particular embodiments, the blade carrier (16) including the airfoil (102) can be formed as one piece having a blade carrier cover width (109) between opposite blade carrier cover peripheral margins (98)(99) of the blade carrier (16) occurring in the range of about 15 mm to about 25 mm with opposite inwardly tapering circular concave airfoil external surfaces (97a)(97b) having a radius occurring in the range of about 15 mm to about 25 mm outwardly extending from corresponding blade carrier cover peripheral margins (98)(99) to the airfoil terminal edge (107) located along the medial longitudinal axis (108) of the blade carrier cover (22) having an airfoil height (110) occurring in the range of about 15 mm to about 25 mm.

The Wiper Arm Connector. Now, with general reference to FIGS. 1 through 61 and with primary reference to FIGS. 28 through 32 and 47 through 52, a wiper arm connector (14) including a first connector portion (111) configured to pivotally mount to a bracket pivot (87) which can interconnect a pair of bracket members (79)(80), and a second connector portion (112) configured to releasably connect to a wiper arm (7) which, depending on the type of wiper arm (7), can include a wiper arm terminal (113) having a configuration, such as: a small J hook, a large J hook, a beam type blade arm ("PTB arm"), an insert and lock arm ("I & L arm"), a pin and hook, a small side pin, a large side pin, or other type of wiper arm terminal (113). In particular embodiments, the second connector portion (112) can be configured to universally connect to any of the above described wiper arm terminals (113), or in particular embodiments, a plurality of wiper arm connectors (12) can be provided with each wiper bracket (15) affording a second connector portion (112) configured to correspondingly releasably connect to each different type of wiper arm terminal (113).

FLUID DISPENSING WIPERS—EXAMPLES

The Bracket Passage. Now with general reference to FIGS. 1 and 4 through 69, in particular embodiments, the wiper bracket (15) can, but need not necessarily, include a bracket passage (114) having a bracket inlet (115) extending from a bracket external surface (115) and having one or more bracket outlets (116) disposed between the pair of bracket members (79)(80). The bracket passage (114) can conduct a fluid (12) received from a fluid reservoir (10) external to the wiper bracket (115) through the bracket inlet (115) to the one or more bracket outlets (116). The illustrative examples of FIGS. 1 and 4 through 69 are not intended to preclude embodiments of the wiper bracket (15) which do not include a bracket passage (15) (as shown in the illustrative example of FIG. 3.

The term "fluid" for the purposes of this invention means a liquid or a gas or a combination thereof, and without limitation to the breadth of the foregoing, includes as illustrative examples air, a mixture of gases, a purified gas, water, alcohol, detergent, surfactant, cleaners, disinfectants, aerosols of gas and liquid droplets, or combinations thereof. The term "fluid flow" for the purposes of this invention means movement of a fluid. The term "fluid source" for the purposes of this invention means a container configured to hold an amount of fluid deliverable to the wiper (2).

Example I. Fluid Dispensing Wiper

The Bracket. Now with primary reference to FIGS. 12 through 21, in particular embodiments, the wiper bracket (15) can include a bracket passage (114) which conducts fluid (12) from the bracket inlet (115) into a first fluid flow passage (117). The bracket passage (114) can, but need not necessarily, bifurcate the first fluid flow passage (117) into a pair of fluid flow passages (117a)(117b) disposed between the pair of bracket members (79)(80) which correspondingly open at outwardly opposite facing pair of bracket outlets (116a)(116b).

The Blade Carrier Cover Hollow Passage. Now, with primary reference to FIGS. 11 through 14, the blade carrier cover (22) can include a blade cover axial hollow passage (118) closed or closable at blade cover second ends (95) of the blade carrier cover (22). In particular embodiments, the hollow passage (118) can be fluidically coupled to one or more bracket outlets (116a)(116b) disposed between the pair of bracket members (79)(80). In the illustrative example of FIGS. 12 and 13, a pair of blade carrier covers (22a)(22b) can correspondingly include one of a pair of axial hollow passages (118a)(118b) open at the blade carrier cover first and second ends (94)(95). The blade carrier cover first ends (94) can be correspondingly received in the bracket first and second end openings (90)(91) and the corresponding axial hollow passages (118a)(118b) can be correspondingly coupled to first and second bracket conduit outlets (116a) (116b) and the blade carrier cover second ends (95) can be disposed proximate a corresponding blade carrier first and second ends (25)(26).

The Fluid Flow Outlets. Now. with primary reference to FIGS. 12 and 13, in particular embodiments, the blade carrier cover (22) can further include one or a plurality of blade carrier cover fluid flow outlets (119) (also referred to as "outlets") open between the axial hollow passage (118) and the carrier cover interior surface (96) of the blade carrier cover (22) facing the blade carrier (16) (as shown in the illustrative example of FIGS. 4, 12 and 13). While the example of the outlets (119) shown in the Figures define circular outlets; this is not intended to preclude embodiments having outlets that define an outlet opening, such as: an ellipse, a square, a rectangle, a rhombus, or combinations thereof. In particular embodiments, the outlets (119) can be disposed in the blade carrier cover (22) to align one or more of the outlets (119) with a corresponding one or more blade carrier passthrough apertures (45) in the blade carrier (16) to allow fluid(s) (12) to egress from one or more fluid flow outlets (119) through the corresponding one or more blade carrier passthrough apertures (45) of the blade carrier (16). As to particular embodiments of the blade carrier cover (22) including one or more fluid flow outlets (119), the blade carrier cover (22) can have a durometer hardness sufficient to avoid contraction or closure of the fluid flow outlets (119) or release of the blade carrier cover axial peripheral margins (98)(99) of the blade carrier cover (22) secured to the corresponding blade carrier peripheral margins (85)(86) during normal use. In particular embodiments, the axial peripheral margins (98)(99) of the blade carrier cover (22) can have a first durometer hardness greater than a second durometer hardness of the cover interior surface (96) of the blade carrier cover (22) including the one or more outlets (119).

The Fluid Flow Nozzles. Now, with primary reference to FIG. 14, in particular embodiments, a nozzle (120) can, but need not necessarily, be secured in one or more of the outlets (119) of the blade carrier cover (22). In particular embodiments, the nozzle (120) can include a nozzle body (121) having a nozzle internal surface (122) defining a nozzle fluid flow path (123) open at nozzle first and second ends (124) (125) and a nozzle external surface (126) configured to engage an outlet (119) in a fixed spatial relation which aligns the nozzle second end (124) with a corresponding blade carrier passthrough aperture (45) upon securement of the blade carrier cover (22) with the blade carrier (16), thereby allowing a fluid (12) to egress from the nozzle second end (125) through the corresponding blade carrier passthrough aperture (45) to or outward of the blade carrier (16). In particular embodiments, a pair of annular members (127) (128) can be disposed in fixed spatial relation a distance apart on the nozzle external surface (126). The nozzle (120) can be secured in the outlet (119) of blade carrier cover (22) by forcibly urging of the nozzle body (121) through the outlet (119) to entrap the thickness of the blade cover (22) between the pair of annular members (127)(128). In particular embodiments, the nozzle body (121) can be configured to interference fit the corresponding blade carrier passthrough aperture (45) to orient the nozzle fluid flow path (123) in fixed spatial relationship to the blade carrier (16). The nozzle (120) can be formed or fabricated having a durometer hardness sufficient to avoid deformation of the nozzle fluid flow path (123) through the nozzle (120) during normal use of the wiper (2). The one or more nozzles (120) can allow outward dispersion of fluid (12) in one or more fluid dispersion patterns such as: hollow cone with narrow dispersal, hollow cone with wide dispersal, full cone, spiral full cone, solid stream, mist, fog, flat fan, flat even, fine spray, droplets, square, whirl, circular, ellipse, or any other fluid dispersion pattern.

The End Caps. In particular embodiments, the blade carrier cover second ends (95) can be formed as closed ends, while in particular embodiments the blade cover second ends (95) can be formed with open ends which can be closed by engagement of a corresponding pair of end caps (23)(24) to blade carrier first and second ends (25)(26) to seal the blade cover axial hollow passage (118), whereby fluid flow necessarily egresses through the outlets (119) or the nozzles (120) depending on the embodiment.

Example II. Fluid Dispensing Wiper

The Bracket. Now with primary reference to FIGS. 33 and 39 through 46, in particular embodiments, the bracket (15) can include a bracket passage (114) which conducts fluid (12) from a bracket inlet (115) to a bracket outlet (116) disposed to engage the blade base (18) upon coupling of the bracket (15) to the blade carrier (16).

The Blade Hollow Passage. Now with primary reference to FIGS. 33, 40 and 64, 65, 67 and 68, particular embodiments of the blade (17) can include a blade base hollow passage (129) which can be disposed in the blade base (18) extending between or open to the base first and second ends (30)(31). The base hollow passage (129) can, but need not necessarily, be fluidically coupled to one or more bracket outlets (116) of the wiper bracket (15). In particular embodiments, the bracket outlet (116) can be fluidically coupled to the base hollow passage (129) by alignment of the bracket outlet (116) with a base inlet aperture (130) open between the base external surface (131) to a hollow passage internal surface (132) of the base hollow passage (129). In particular embodiments, the bracket outlet (116) can fluidically couple to the base hollow passage (129) by interference fit with the base inlet aperture (130). In particular embodiments, the bracket outlet (116) can, but need not necessarily, be configured pass through the one or more blade carrier passthroughs apertures (45) in the blade carrier (14) and penetratingly couple to the base (18).

Bracket Piercing Element. Now, with primary reference to FIG. 40, in particular embodiments, the one or more bracket outlets (116) can, but need not necessarily, taper approaching the bracket outlet terminal (133). The bracket outlet terminal (133) can be configured to penetratingly couple to the wiper blade base (18) by contacting and penetrating the base external surface (131). In particular embodiments, the bracket outlet terminal (133) can be configured to penetrate the base external surface (131) through to the base hollow passage (129) disposed in the wiper blade base (18) to fluidically connect the bracket inlet (115) to the base hollow passage (129) of the base (18). Fluid (12) can, but need not necessarily, be delivered through the bracket inlet (115) to egress from the bracket outlet (116) into the base hollow passage (129).

End Caps To Seal Base Hollow Passage. Now, with primary reference to FIGS. 53 through 57, in particular embodiments, the base hollow passage (129) can, but need not necessarily, be formed open to at the base first or second ends (30)(31). In particular embodiments, a first end cap (134) and a second end cap (135) can be configured to slidably couple to the blade carrier (16), as above described, and can optionally include an outwardly extending plug (136) configured to insertingly seal the hollow passage (129) and obstruct egress of fluid (12) from the hollow passage (119) at the base first or second end (30)(31).

End Caps to Deliver Fluid to Base Hollow Passage. Now, with primary reference to FIGS. 58 through 61, in particular embodiments, the base hollow passage (129) can, but need not necessarily, be formed open to at the base first or second ends (30)(31). In particular embodiments which may lack a bracket passage (114), a first end cap (134) or a second end cap (135) can be configured to slidably couple to the blade carrier (16), as above described, and can optionally include a cap conduit inlet (136) fluidically connected to a cap conduit outlet (137) outwardly extending from the first or second end cap (134)(135). The cap conduit outlet (137) can be configured to fluidically couple the base hollow passage (129) to a fluid reservoir (10) to deliver fluid (12) to the base hollow passage (129). In particular embodiments, the hollow passage (129) can be closed to the base external surface (131) at both the base first end or the base second end (30)(31) which can, but need not necessarily, be configured to be penetrated by the first or second end cap (134)(135) to fluidically couple the hollow passage (129) the fluid reservoir (10). This is not intended to preclude embodiments where one of the base first and second ends (30)(31) are formed open, or embodiments where both base first and second ends (30)(31) are formed closed.

The Hollow Passage Outlets. Now, with primary reference to FIGS. 64 and 65 and FIGS. 67 and 68, particular embodiments of the wiper (2) or wiper blade (17) can, but need not necessarily, include one or more blade hollow passage outlets (138) fluidically coupled to the blade hollow passage (129) and open to the base external surface (131). In embodiments having a plurality of outlets (138), the plurality of outlets (138) can, but need not necessarily, be disposed in spaced apart relation on a base external surface (131).

Figure 65:
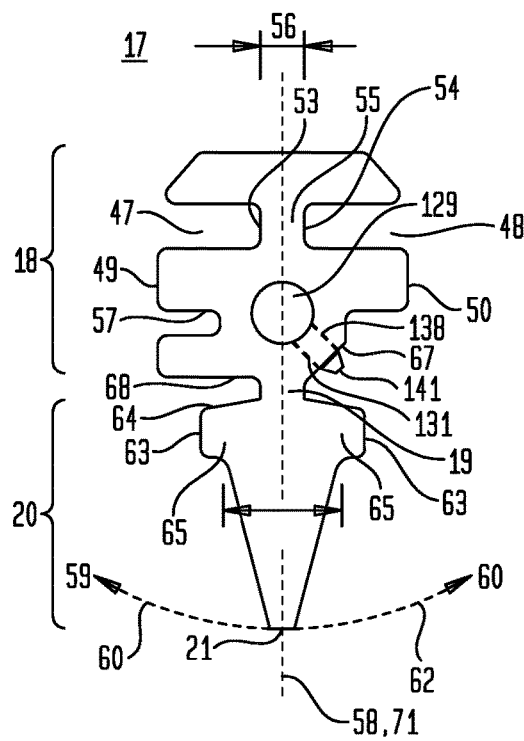
FIG. 65 is and end view of another particular embodiment of a wiper blade having a taper in the blade base and having a hollow passage disposed in the blade base and an outlet extending from the hollow passage open at an external surface of the blade base.

Now, with primary reference to FIGS. 64 and 65, in embodiments of the wiper (2) having a single sweep (20) extending from the base (18), the one or more outlets (138) can, but need not necessarily, be disposed on a base external surface (131) allowing fluid (12) to be dispersed from the one or more outlets (138) outward of a sweep first side (139) or outward of a sweep second side (140). As can be seen in the illustrative example in FIGS. 67 and 68, in embodiments having a plurality of blades (17), the one or more outlets (138) can, but need not necessarily, be disposed on the base external surface (131) between a pair of blades (17a)(17b).

The Nozzles. Now, with primary reference to FIGS. 64 and 64 and 67 and 68, in particular embodiments, the one or more hollow passage outlets (138) can outwardly terminate in one or more hollow passage nozzles (141). The one or more nozzles (141) can be fluidically coupled to the one or more outlets (138) and can, but need not necessarily, be formed as one piece with the base (18). The one or more nozzles (141) can allow outward fluid dispersion in one or more fluid dispersion patterns (142) such as: hollow cone with narrow dispersal, hollow cone with wide dispersal, full cone, spiral full cone, solid stream, mist, fog, flat fan, flat even, fine spray, droplets, square, whirl, circular, ellipse, or any other fluid dispersion pattern.

As can be easily understood from the foregoing, the basic concepts of the present invention may be embodied in a variety of ways. The invention involves numerous and varied embodiments of a wiper and methods for making and using such wiper including the best mode.

As such, the particular embodiments or elements of the invention disclosed by the description or shown in the figures or tables accompanying this application are not intended to be limiting, but rather illustrative of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "wiper" should be understood to encompass disclosure of the act of "wiping"—whether explicitly discussed or not—and, conversely, were there effectively disclosure of the act of "wiping", such a disclosure should be understood to encompass disclosure of a "wiper" and even a "means for wiping." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in Merriam-Webster's Collegiate Dictionary, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Thus, the applicant(s) should be understood to claim at least: i) each of the wipers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A wiper blade, comprising:
   a base having a base first side opposite a base second side joined by a base face, said base first side or said base second side includes a taper extending between said base first side or said base second side and said base face;
   a flexible member outwardly projecting from said base face and extending between said base first end and said base second end;
   a sweep outwardly projecting from said flexible member to terminate in a sweep terminal, said flexible member flexes to allow said sweep terminal to travel from a resting position toward said taper or away from said taper, said sweep engaging said taper to delimit travel of said sweep toward said taper in a first degree arc, said sweep engaging said base face to delimit travel of said sweep away from said taper in a second degree arc; and wherein
   said first degree arc has a maximum angle greater than a maximum angle of said second degree arc.

2. The wiper blade of claim 1, wherein said first degree arc delimited to have said maximum angle which occurs in a range of about greater than or equal to 35 degrees and less than or equal to 60 degrees.

3. The wiper blade of claim 2, wherein said second degree arc delimited to have said maximum angle which occurs in a range of about greater than or equal to 15 degrees and less than or equal to 30 degrees.

4. The wiper blade of claim 3, further comprising a sweep stop member outwardly extending from said sweep, said sweep stop member configured to contact said taper during travel of said sweep in said first degree arc or to contact said blade face during travel of said sweep in said second degree arc.

5. The wiper blade of claim 1, further comprising:
   a hollow passage disposed within a base between said base first end and said base second end; and
   one or more outlets open between said hollow passage to a base external surface.

6. The wiper of claim 5, further comprising one or more nozzles coupled to said one or more outlets.

* * * * *